US006300039B1

(12) United States Patent
Ohbayashi et al.

(10) Patent No.: US 6,300,039 B1
(45) Date of Patent: *Oct. 9, 2001

(54) OPTICAL RECORDING MEDIUM

(75) Inventors: Gentaro Ohbayashi, Kusatsu; Hitoshi Nobumasa, Otsu; Kusato Hirota, Otsu; Kunihisa Nagino, Otsu; Futoshi Okuyama, Otsu, all of (JP)

(73) Assignee: Toray Industries, Inc., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/951,833

(22) Filed: Oct. 16, 1997

Related U.S. Application Data

(63) Continuation of application No. 08/553,645, filed as application No. PCT/JP95/00565 on Mar. 27, 1995, now abandoned.

(30) Foreign Application Priority Data

| Mar. 25, 1994 | (JP) | 6-055992 |
|---|---|---|
| Aug. 23, 1994 | (JP) | 6-198518 |
| Aug. 23, 1994 | (JP) | 6-198519 |
| Aug. 31, 1994 | (JP) | 6-207365 |
| Aug. 31, 1994 | (JP) | 6-207366 |
| Nov. 6, 1994 | (JP) | 6-272700 |
| Nov. 7, 1994 | (JP) | 6-272699 |
| Dec. 26, 1994 | (JP) | 6-322972 |

(51) Int. Cl.$^7$ .................................. G11B 7/24
(52) U.S. Cl. ............ 430/270.13; 430/945; 369/275.2; 369/275.5; 428/64.5; 428/64.6
(58) Field of Search ............... 369/275.2, 275.5; 430/945, 270.13; 428/64.1, 64.5, 64.6

(56) References Cited

U.S. PATENT DOCUMENTS

| 4,430,659 | * | 2/1984 | Maffitt et al. | 430/945 |
|---|---|---|---|---|
| 4,637,976 | * | 1/1987 | Terao et al. | 430/945 |
| 5,241,524 | * | 8/1993 | Lee | 269/50 |
| 5,395,735 | * | 3/1995 | Nagata et al. | 430/270.13 |
| 5,506,022 | * | 4/1996 | Ide et al. | 430/945 |
| 5,652,036 | * | 7/1997 | Kobayashi | 430/945 |
| 5,709,978 | * | 1/1998 | Hirosune et al. | 430/945 |

FOREIGN PATENT DOCUMENTS

| 0 574 025 A2 | 12/1993 | (EP) . | |
|---|---|---|---|
| 0 630 007 A1 | 12/1994 | (EP) . | |
| 61-110349 | 5/1986 | (JP) . | |
| 61-131254 | * 6/1986 | (JP) | 369/275.2 |
| 5-159360 | * 6/1993 | (JP) . | |
| 6-150379 | * 5/1994 | (JP) . | |
| 6-236578 | * 8/1994 | (JP) . | |

OTHER PUBLICATIONS

Ohta et al., "Phase Change Disk having Rapid Cooling Structure", Jap. J. Appl. Phys. vol 28(3) pp 123–128, 1989.*
Ide et al. "Phase Change Media for High Linear Velocity and High Recording Denisty" SPIE vol. 1663 (Optical Data Storage), pp 305–310, 1992.*
Ishida, et al. "Overwrite Charachtoristics in Phase Change Optical Disk" Jap. J. Appl. Phys., vol. 28(3), pp. 129–133, 1989.*
Nishiuchi et al., "Feasibility Studies of Ge–Sb–Te . . . ", Proc. Int. Symp. on Optical Memory, 1991, pp. 291–296.*
Bains, Sunny, "Sony Research Center . . . " OE Reports, Oct. 1995.*
Okada et al, "Phase Change Optical Disk . . . " Trans. Mat. Res. Soc. Jpn., vol. 15B, 1994?.*
Ohta et al., "Phase Change Disk Media Having Rapid Coling Structure", vol. 28, Suppl. 28–3, pp 123–128 (© 1989).*

* cited by examiner

*Primary Examiner*—Martin Angebranndt
(74) *Attorney, Agent, or Firm*—Morrison & Foerster LLP

(57) ABSTRACT

Phase-change type rewritable optical recording media, such as optical discs, optical cards, and optical tapes, where recorded data can be erased or overwritten and where data can be recorded with high speed and high density by applying a light beam can include an optical recording medium is one that includes a laminate member, which in various embodiments contains a transparent substrate, a first dielectric layer, a recording layer, a second dielectric layer, a light absorbing layer, and/or a reflecting layer. In various embodiments of the invention, the shortest distance between recorded marks in the recording direction along the track is less than $\lambda/NA$, with $\lambda$ and NA denoting the wavelength of the light used and the numerical aperture of the objective lens of the optical head, respectively.

101 Claims, No Drawings

OPTICAL RECORDING MEDIUM

This application is a continuation of application Ser. No. 08/553,645, filed Nov. 22, 1995, now abandoned, which is a 371 of PCT/JP95/00565 filed Mar. 27, 1995.

TECHNICAL FIELD

The present invention relates to optical recording media wherein the recording, erasing, and reading data are carried out by applying a light beam. The invention particularly relates to phase-change type rewritable optical recording media such as optical disks, optical card, optical tapes, etc., wherein recorded data can be erased or overwritten and wherein data can be recorded with high speed and high density.

BACKGROUND TECHNIQUES

Techniques for conventional phase-change type rewritable optical recording media are as follows.

Those optical recording media have a recording layer consisting mainly of telluride, which, for recording, is partially melted by applying a converged pulsed laser beam to the crystalline-state recording layer for a short period of time. The melted portion is rapidly cooled and solidified due to thermal diffusion, resulting in the formation of an amorphous record mark. With an optical reflectivity lower than that for the crystalline state, the record mark can read a signal.

To erase the data, a laser beam is applied to the record mark to heat the recording layer up to a temperature that is lower than the melting point but higher than the crystallization temperature so that the amorphous record mark portion is crystallized to allow that portion of the layer to recover the unrecorded state.

The known materials for the recording layer of such phase-change type rewritable optical recording media include some alloys such as $Ge_2Sb_2Te_5$ (N. Yamada et al., Proc. Int. Symp. on Optical Memory 1987 pp.61–66).

These optical recording media with its recording layer consisting of a Te alloy has a high crystallization rate to allow high-speed overwriting to be performed by varying the power of the beam which has a circular cross-section. In the optical recording media with such a recording layer, a heat-resistant transparent dielectric layer is provided on both sides of the recording layer to prevent deformation and opening formation from occurring on the recording layer during the recording process. In addition, there are other known techniques which use a reflecting metal layer, of Al etc., provided over the dielectric layer so that some optical interference is caused to improve the signal contrast during reading and so that the recording layer is cooled efficiently to facilitate the formation of amorphous record marks and to improve the erasing characteristics and repeated use characteristics.

In particular, it has been known that a structure where the dielectric layer between the recording layer and the reflection layer is about 50 nm or less in thickness (rapid cooling disk structure) is small in the variation of recording characteristics due to repeated erasing and writing and wide in erasing power margin as compared to ones with a dielectric layer with about 200 nm or more thickness (thick second dielectric layer structure)(T. Ohta et al. Japanese Journal of Applied Physics, Vol.28 (1989) Suppl.28-3, pp123–128).

These conventional phase-change type rewritable optical recording media have such problems as follows:

In the case of the conventional structure, the shape and position of an overwritten record mark is affected by the mark recorded before the overwriting, resulting in limits to the erasing rate and jitter characteristics. In particular, said problems may worsen when the data density for pit position recording is increased by, for example, using short-wave laser to reduce the size of optical spots, or when the data density for mark-edge recording, instead of conventional pit position recording, is increased by, similarly to the case of pit position recording, using short-wave laser to reduce the size of optical spots, or when data are recorded at a high linear-velocity.

This may be attributed to the fact that the difference of the reflectance between the crystalline portions and the amorphous record mark portions is so large that the light absorption by the amorphous portions of the recording layer becomes larger than that by the crystalline portions, causing the record mark portions that carry data to be heated more rapidly during the recording process. Thus, the heating of a portion during the recording process becomes dependent on whether the portion is crystalline or amorphous before the overwriting. This may results in the fact that the shape and position of the record marks in an overwritten portion are affected by the mark existing before overwriting to impose limits to the erase ratio and jitter characteristics. With the conventional rapid cooling disk structure, in particular, a layer of aluminum, gold, etc., with a high thermal conductivity and high reflectance is provided on the dielectric layer on that side which is not exposed to the incident light in order to obtain high durability and good recording characteristics. When such a high-reflectance layer is provided, however, it is difficult to solve the problem that the light absorption by the amorphous portions of the recording layer becomes larger than that by the crystalline portions.

If the distances between record marks are decreased to less than about the size of the incident light beam ($\lambda$/NA) in an attempt to increase the recording density, limitations associated with the optical resolution will reduce the amplitude of read signals. If, in particular, data for which the distances between record marks are decreased to less than about the size of the incident light beam ($\lambda$/NA) are overwritten, the shape and position of the record marks are affected by the marks existing before the overwriting to impose limits to the erase ratio and jitter characteristics, which may also be a factor in this problem.

To solve these problems, the technique described below has been known as a means to prevent the light absorption by the amorphous portions from becoming larger than that by the crystalline portions. That is, as proposed in the Patent Laid-Open (Kokai) HEI 5-159360, a second dielectric layer with a 220 nm thickness is formed first, and then a Ti layer for light absorption with a 50 nm thickness is formed, followed by the formation of a relatively thin Al layer for heat radiation with an about 50 nm thickness to reduce the thermal load imposed on the light absorbing layer due to the absorption.

SUMMARY OF THE INVENTION

With the above-mentioned structure, which is of a so-called thick second dielectric layer structure type, the thickness of the second dielectric layer is a large 220 nm, leading to a small degree of cooling of the recording layer during a recording process. Therefore, repeated erasing and writing rapidly decrease the recording characteristics and thermal interference between marks also rapidly decrease the jitter characteristics etc., making the layer less suitable for high-density recording. Other problems include the impossibility of achieving a sufficient carrier to noise (C/N) ratio in a low linear velocity range.

The present invention relates to the improvement of the erasing characteristics of the conventional optical recording media with a rapid cooling disk structure which have good repeated use characteristics as describe above, and the invention aims to provide optical recording media with good erasing and jitter characteristics.

Another object of the invention is to provide optical recording media with high cyclability.

These objects are achieved by the following features of the invention. The invention relates to an optical recording medium, wherein a recording layer is formed on a substrate to which a light beam is applied to record, erase, and read data with said recording and erasing of data being carried out by means of phase changes between amorphous and crystalline, and which recording medium comprises a laminate member consisting at least of a transparent substrate, first dielectric layer, recording layer, second dielectric layer, light absorbing layer, and reflecting layer, with the second dielectric layer having a thickness of 1 nm or more and 50 nm or less. This is called Item 1 of the invention.

The invention also relates to an optical recording medium, wherein a recording layer is formed on a substrate to which a light beam is applied to record, erase, and read data with said recording and erasing of data being carried out by means of phase changes between amorphous and crystalline, and which recording medium comprises a laminate member consisting at least of a transparent substrate, first dielectric layer, recording layer, second dielectric layer, and light absorbing layer, with the second dielectric layer having a thickness of 1 nm or more and 30 nm or less. This is called Item 2 of the invention.

The invention also relates to an optical recording medium, wherein a recording layer is formed on a substrate to which a light beam is applied to record, erase, and read data with said recording and erasing of data being carried out by means of phase changes between amorphous and crystalline; the amplitude of the read signal from a record mark that is more than $\lambda$/NA apart from both the preceding one and the following one in the recording direction along the track being equal to or less than five times the amplitude of the read signal from a record mark that does not meet the above-mentioned record mark spacing conditions, with $\lambda$ and NA denoting the wave length of the light used and the numerical aperture of the objective lens of the optical head, respectively. This is called Item 3 of the invention.

The invention also relates to an optical recording medium, wherein a recording layer is formed on a substrate to which a light beam is applied to record, erase, and read data with said recording and erasing of data being carried out by means of phase changes between amorphous and crystalline; the carrier to noise ratio of the read signal from a record mark that is more than $\lambda$/NA apart from both the preceding one and the following one in the recording direction along the track being less than the carrier to noise ratio of the read signal from a record mark that does not meet the above-mentioned record mark spacing conditions, with $\lambda$ and NA denoting the wave length of the light used and the numerical aperture of the objective lens of the optical head, respectively. This is called Item 4 of the invention.

The invention also relates to optical recording media wherein, when a record mark that is more than $\lambda$/NA apart from both the preceding one and the following one in the recording direction along the track is overwritten by a record mark that does not meet the above-mentioned record mark spacing conditions, the amplitude of the read signal from the latter overwriting record mark is equal to or larger than five times the amplitude of the read signal from the remainder of the former record mark that has been erased by the overwriting process. This is called Item 5 of the invention.

The invention also relates to an optical recording medium, wherein a recording layer is formed on a substrate to which a light beam is applied to record, erase, and read data with said recording and erasing of data being carried out by means of phase changes between amorphous and crystalline; the recorded area of a record mark that is more than $\lambda$/NA apart from both the preceding one and the following one in the recording direction along the track being less than the recorded area of a record mark that does not meet the above-mentioned record mark spacing conditions, with $\lambda$ and NA denoting the wave length of the light used and the numerical aperture of the objective lens of the optical head, respectively. This is called Item 6 of the invention.

The invention also relates to an optical recording medium as specified in Item 3, Item 4, Item 5, or Item 6, comprising: a recording layer formed on a substrate to which a light beam is applied to record, erase, and read data with said recording and erasing of data being carried out by means of phase changes between amorphous and crystalline, and which recording medium comprises a laminate member consisting at least of a transparent substrate, first dielectric layer, recording layer, second dielectric layer, light absorbing layer, and reflecting layer, with the second dielectric layer having a thickness of 1 nm or more and 50 nm or less. This is called Item 7 of the invention.

The invention also relates to an optical recording medium as specified in Item 3, Item 4, Item 5, or Item 6, comprising: a recording layer formed on a substrate to which a light beam is applied to record, erase, and read data with said recording and erasing of data being carried out by means of phase changes between amorphous and crystalline, and which recording medium comprises a laminate member consisting at least of a transparent substrate, first dielectric layer, recording layer, second dielectric layer, and light absorbing layer, with the second dielectric layer having a thickness of 1 nm or more and 30 nm or less. This is called Item 8 of the invention.

The invention also relates to the thickness of the recording layer, the thickness, physical properties and materials of the light absorbing layer, and the layer structure of optical recording media as specified in Item 1, Item 2, Item 3, Item 4, Item 5, Item 6, Item 7, and Item 8.

In optical recording media as specified in Item 1 and Item 7 a light absorbing layer may be newly provided between the second dielectric layer and the reflecting layer so that the light absorption by the amorphous-state recording layer is reduced to allow the difference in light absorption between the amorphous state and the crystalline state to decrease. This reduces the difference in the temperature rise during recording, the deformation of the record marks, and the shift in their position, resulting in improved erasing and jitter characteristics. If such a reflecting layer does not exist as in Item 2 and Item 8, the use of a light absorbing layer may cause a decrease in the light absorption by the amorphous-state recording layer to allow the difference in light absorption between the amorphous state and the crystalline state to decrease. This reduces the difference in the temperature rise during recording, the deformation of the record marks, and the shift in their position, resulting in improved erasing and jitter characteristics.

THE BEST EMBODIMENTS OF THE INVENTION

A light absorbing layer as used for the invention consists of metallic material that has an optical reflectance of 40–85% and a light absorption rate of 20–50% for light with a wave length of λ which is used for recording and reading. This light absorption leads to a decrease in the light absorption by the amorphous-state recording layer.

The material preferably consists of at least one of the following metals or their alloys because of high heat resistance, high strength, high corrosion resistance, and appropriately high heat conductivity: Ti, Zr, Hf, Cr, Ta, Mo, Mn, W, Nb, Rh, Ni, Fe, Pt, Os, Co, Zn, and Pd.

In particular, Ti, Nb, W, Mo, Zr, or Cr, or an alloy of two or more of these, or a NiCr alloy are preferable because of relatively low required material costs and high adhesive performance of the resultant layer.

The best results will be obtained with Ti, Nb, or W, because the optical constants of the resultant material are in a suitable range, because its required cost is small, and also because its heat conductivity is appropriately large.

The best results will also be obtained with material that consists of either W or Mo as an essential ingredient, plus one or more metals because the optical constants of such a material are in a suitable range, and also because its heat conductivity is appropriately large. In this case, such material preferably consist of either W or Mo, plus at least one of the following: Re, Os, Nb, Ti, Te, Cr, Zr, Y, Hf, Ta, V, Sc, Mn, Ru, Fe, Co, Rh, Ir, Ni, Pd, Pt, and Au. Moreover, such material more preferably consist of either W or Mo as an essential ingredient, plus at least one of the following because of their low prices: Nb, Ti, Te, Cr, Zr, Y, Hf, Ta, and Co. The metallic material preferably contain either W or Mo up to a content of 5–95 atomic %, preferably 50–95 atomic %.

Materials that consist of at least one from the group of Ti, Nb, Mo, W, and Te, as an essential ingredient, plus at least one from the group of high melting point carbides, oxides, borides, and nitrides, are also good for use because their optical constants are in a suitable range and also because their heat conductivity is appropriately large. In this case, the one or more metals selected from the group of Ti, Nb, Mo, W, and Te, is preferably contained in the light absorbing layer material up to a content of 5–95 atomic %, more preferably 30–95 atomic %. A high melting point as referred to herein has a melting point of 1,000° C. or higher. The high melting point carbides include HfC, TaC, $Ta_2C$, NbC, ZrC, TiC, VC, $W_2C$, WC, $MO_2C$, MOC, SiC, $B_4C$, and $Cr_3C_2$. The high melting point oxides include $ThO_2$, $HfO_2$, MgO, $ZrO_2$, BeO, $Cr_2O_3$, [alpha]-$Al_2O_3$, and $TiO_2$. The high melting-temperature borides include $HfB_2$, $TaB_2$, $ZrB_2$, $NbB_2$, $TiB_2$, $W_2B_5$, $CrB_2$, $VB_2$, FeB, $Fe_2B$, and $Mo_2B_5$. The high melting point nitrides include BN, TaN, TiN, ZrN, AlN, NbN, VN, CrN, and β-$Si_3N_4$.

Mixtures or alloys of W and Si and mixtures or alloys of Mo and Si are also good for use because of their high heat resistance, high strength, and high corrosion resistance.

In the case of Item 1 and Item 7, the thickness of the light absorbing layer is preferably in the range of 1–100 nm. Light is not absorbed to a sufficient degree if the thickness of the light absorbing layer is below the range. In most cases, the material used for the light absorbing layer is not significantly larger in heat conductivity than the material used for the reflecting layer, and therefore, the use of a light absorbing layer thicker than the above-mentioned range reduces the degree of cooling of the recording layer, leading to a decrease in the advantage of a rapid cooling structure.

In the case of Item 2 and Item 8, the thickness of the light absorbing layer is preferably in the range of 25–200 nm. Light is not absorbed to a sufficient degree if the thickness of the light absorbing layer is below the range, as in the case of Item 1 and Item 7. The light absorbing layer plays a role in cooling the recording layer during the recording process, but this cooling of the recording layer cannot be performed efficiently in the case of Item 2 and Item 8 leading to a deterioration in the erasing performance. If the thickness of the light absorbing layer is above the range, the use of material with a small heat conductivity reduces the erasing performance, while the use of material with a large heat conductivity causes excessive cooling, leading to the need of a large power for forming record marks, which is not practical.

Material used for the light absorbing layer preferably have a heat conductivity in the range of 10–200 W/m·K. If high in heat conductivity, the light absorbing layer can serve to cool the recording layer during the recording process, removing heat from layer. If the heat conductivity of the light absorbing layer is lower than the above-mentioned range, the recording layer is not cooled sufficiently during the recording process, leading to a deterioration in the advantage of a rapid cooling disk structure. Thus, the thickness of the light absorbing layer cannot be increased, making it impossible to achieve significant light absorption. The heat conductivity more preferably be in the range of 20–200 W/m·K.

The heat conductivity of the materials for the light absorbing layer is defined for those materials in their bulk state. Such values are reported, for example, in Iwanami Rikagaku Jiten published by Iwanami Shoten as follows: Cr (90 W/m·K), Ta (58 W/m·K), Mo (138 W/m·K), W (178 W/m·K), Nb (54 W/m·K), Ti (22 W/m·K), Rh (150 W/m·K), Ni (91 W/m·K), Fe (80 W/m·K), Pt (71 W/m·K), Os (88 W/m·K), Co (99 W/m·K), Zn (62 W/m·K), and Pd (76 W/m·K).

To enhance the light absorption, the optical constants of the light absorption layer must be in a suitable range. For the light with a specific wave length, a material used for the light absorbing layer preferably show a optical constant with the refractive index and the extinction coefficient being in the range of 1.0–8.0 and 1.5–6.5, respectively. To further enhance the light absorption, the refractive index and the extinction coefficient of the optical constant of the light absorbing layer more preferably in the range of 2.0–5.0 and 2.0–5.5, respectively.

Major optical constants of these materials for the light absorbing layer are cited for example in "Handbook of Optical Constants of Solids II" Edward D. Palik (Editor), Academic Press, Inc. Optical constants of such a layer as used in the optical recording media of the present invention are measured for example as follows. When the optical recording medium is a phase-change type rewritable optical disk, adhesive tape etc. may be used to peel off the relevant layer to provide a specimen. In another way, thin film of the same material as used for the light absorbing layer may be formed on a surface of quartz glass to provide a specimen. Measurements are made using light with the same wave length as used for the recording, erasing and reading in combination with an apparatus as described below:

Measuring apparatus: phase-contrast measuring equipment

NPDM-1000 manufactured by Nikon Corp.

Spectroscope: M-70

Light source: halogen lamp

Detector surface: Si-Ge

Polarizer, analyzer: Glan-Thompson

Revolving speed: 2

Incidence angle: 45–80', pitch 2'

The first and the second dielectric layer of the invention serve to protect the substrate and the recording layer by, for example, preventing the substrate and the recording layer from deterioration in recording characteristics due to thermal deformation during the recording process and also serve to improve the signal's contrast during the reading process by means of optical interference. The materials useful for such dielectric layers include metallic sulfides, metallic oxides, metallic nitrides, and metallic carbides, including ZnS, $SiO_2$, silicon nitride, aluminum oxide, ZnC, and ZnSe, and their mixtures, in the form of thin film. In particular, thin film of ZnS, thin film of the oxide of such a metal as Si, Ge, Al, Ti, Zr, Ta, etc., thin film of the nitride of such a metal of Si, Al, etc., thin film of the carbide of such a metal as Ti, Zr, Hf, etc., and film of a mixture of these compounds are desirable due to their high heat resistance. They may contain carbon, a carbide such as SiC, or a fluoride such as $MgF_2$ to reduce the residual stress of the film. The most desirable ones include film of a $ZnS-SiO_2$ mixture and film of a $ZnS-SiO_2-C$ mixture because such film does not suffer rapid deterioration in recording sensitivity, C/N or erase ratio from repeated recording and erasing.

The thickness of the first dielectric layer is generally in the range of about 10–500 nm. The thickness should preferably in the range of 50–400 nm to prevent the layer from being peeled off the substrate or the recording layer and to prevent defects such as cracks. In particular, the difference in light absorption between the recording layer in the crystalline state and that in the amorphous state can be reduced when the thickness of the first dielectric layer meets the following equation:

$$N\lambda/4 - 0.2\lambda \leq ndl \leq N\lambda/4 + 0.2\lambda$$

where N is an integer 1, 3, or 5, λ the wave length of the light used for the recording, n the refractive index of the first dielectric layer, and dl the thickness of the first dielectric layer.

The material to be used for the second dielectric layer may be selected from those cited for the first dielectric layer, or may be different from them.

In the case of Item 1 and Item 7, the thickness of the second dielectric layer must be in the range of 1–50 nm. A second dielectric layer with a smaller thickness may cause the formation of defects such as cracks and reduce the resistance to repeated use. A second dielectric layer with a larger thickness may reduce the degree of cooling of the recording layer during the recording process. Taking into account the resistance to repeated use and the degree of cooling of the recording layer during the recording process, the thickness is preferably 1 nm or more and 25 nm or less. In the case of Item 2 and Item 8, it is preferably 1 nm or more and less than 30 nm. As in the case of Item 1 and Item 7, a second dielectric layer with a smaller thickness may cause the formation of defects such as cracks and reduce the resistance to repeated use. A second dielectric layer with a larger thickness may reduce the degree of cooling of the recording layer during the recording process. In particular, the optical recording media as specified in Item 2 and Item 8 do not have a reflecting layer, and therefore, the degree of cooling tends to be smaller as compared to Item 1 and Item 7. Thus, the upper limit of the thickness of the second dielectric layer for Item 2 and Item 8 is lower than for Item 1 and Item 7. Taking into account the resistance to repeated use and the degree of cooling of the recording layer during the recording process, as in the case of Item 1 and Item 7, the thickness is preferably 3 nm or more and 25 nm or less. To solve the problem with a thick second dielectric layer used for optical recording media as specified in Item 2 and Item 8, a technique that uses a reflecting layer that consists of W containing Au up to 5 atomic % or more has been known (Japanese Patent Laid-Open (Kokai) HEI 3-178051). With this technique, a 30 nm thick recording layer is formed on a 100 nm thick first dielectric layer, followed by the formation of a 30 nm thick second dielectric layer and a reflecting layer consisting of 50 nm thick W containing Au up to 5 atomic % or more. Such a constitution, however, cannot achieve a sufficient degree of cooling, largely reducing the erase ratio and jitter characteristics. Furthermore, this does not have a mechanism to adjust the difference in light absorption between record mark portions and unrecorded portions. Thus, for a laser beam with a wave length of 680 nm or 780 nm for example, the light absorption for the amorphous state is larger than that for the crystalline state, which largely reduces the erase ratio during the overwriting process and jitter characteristics.

The reflecting layer as specified in Item 1 and Item 7 of the invention improves the contrast by means of optical interference, serving to cool the recording layer during the recording process by removing heat from the layer.

The materials useful for the reflecting layer include metals that reflect light such as Al, Au, Ag, Cu, etc., alloys consisting of them with such additive elements as Ti, Te, Cr, Hf, etc., and such metals as Al and Au containing such metallic compounds as nitrides, oxides and chalcogenides of Al, Si, etc. Such metals as Al and Au and alloys consisting of them as main component are desirable because a high reflectance and high heat conductivity can be achieved. Such alloys include Al alloys containing one or more elements selected from the group of Mg, Cu, Pd, Ti, Cr, Hf, Ta, Nb, and Mn up to a total content of 0.5 atomic % or more and 5 atomic % or less, and Au alloys containing one or more elements selected from the group of Cr, Ag, Cu, Pd, Pt, and Ni, and Mn up to a total content of 1 atomic % or more and 20 atomic % or less.

Alloys consisting of Al as main component are desirable because material costs can be minimized. Particularly desirable ones with high corrosion resistance include Al alloys containing one or more elements selected from the group of Ti, Cr, Ta, Hf, Zr, Mn, and Pd up to a total content of 0.5 atomic % or more and 5 atomic % or less, and Al alloys containing Si and Mn up to a total content of 5 atomic % or less.

Among others, such alloys containing Al as main component as Al-Hf-Pd alloys, Al-Hf alloys, Al-Ti alloys, Al-Ti-Hf alloys, Al-Cr alloys, Al-Ta alloys, and Al-Si-Mn alloys are very useful as material for the reflecting layer because of being highly corrosion-resistant and free from the formation of hillock etc.

Unless harmful to the effects of the invention, the reflecting layer of the invention may be provided with a protective layer of $SiO_2$, Zn, or $ZnS-SiO_2$, a resin layer of ultraviolet-curing type resin etc., or an adhesive layer for adhesion with another substrate. Two substrates, facing each other, may be adhered with an adhesive agent after the formation of the reflecting layer etc. or after the formation of such a protective layer or a resin layer as describe above.

In the case of Item 2 and Item 8 the light absorbing layer may be provided with a protective layer of $SiO_2$, Zn, or ZnS-$SiO_2$, a resin layer of ultraviolet-curing type resin etc., or an adhesive layer for adhesion with another substrate. Two substrates, facing each other, may be adhered with an adhesive agent after the formation of the light absorbing layer etc. or after the formation of such a protective layer or a resin layer as describe above over the surface of the light absorbing layer.

The substrate may be provided with a hub.

The materials useful for the recording layer include, but not limited to, the Pd-Ge-Sb-Te alloy, Nb-Ge-Sb-Te alloy, Pd-Nb-Ge-Sb-Te alloy, Pt-Ge-Sb-Te alloy, Ge-Sb-Te alloy, Co-Ge-Sb-Te alloy, In-Sb-Te alloy, Ag-In-Sb-Te alloy, and In-Se alloy. The Pd-Ge-Sb-Te alloy, Nb-Ge-Sb-Te alloy, Pd-Nb-Ge-Sb-Te alloy, and Ge-Sb-Te alloy are very useful because they are highly resistant to repeated rewriting. In particular, the Pd-Ge-Sb-Te alloy, Nb-Ge-Sb-Te alloy, Pd-Nb-Ge-Sb-Te alloy, and Pt-Ge-Sb-Te alloy are useful because they are small in required erasing time, resistant to repeated recording and erasing, and high in recording characteristics such as the C/N ratio and erase ratio.

The thickness of the recording layer is preferably in the range of 10–45 nm. A recording layer with a smaller thickness may suffer heavy deterioration in the recording characteristics due to repeated rewriting. A recording layer with a larger thickness may suffer a shift of the recording layer due to repeated recording and erasing, leading to a deterioration in the jitter characteristics.

Conventionally, when data are recorded on an optical recording medium such as phase-change type rewritable optical disk, laser pulses with a constant time length and recording power level are applied to the positions of the record marks to be made. So, when recording is carried out by the mark position recording method, for example, record marks with a nearly constant size and area are formed along the track, corresponding to the modulation code.

For equipment that allows data to be rewritten by overwriting, a design that reduces the amplitude of the signals from the previously recorded data will decrease the above-mentioned difference between the light absorption by the amorphous portion and that by the crystalline portion and will also decrease the degree of uneven heating due to the difference in heat conductivity. A design that improve the performance for erasing the previously recorded data will decrease the distortion of the read waveform.

In a portion where the distance between recorded marks is smaller than the size of the light beam used ($\lambda$/NA), limitations on the optical resolution reduce the amplitude of read signals. Normal data detection becomes more difficult as the amplitude of the read signals from this portion decreases largely. The amplitude of read signals can be calculated from the carrier values at a specific frequency that are determined by means of frequency division with a spectrum analyzer as described, for example, on pp.219–220 of "Hikari Disuku Gijutsu (Optical Disk Technology)" published by Rajio Gijutsu-sha (1989).

In view of this, the invention provides optical recording media that can record data in such a way that: the amplitude of the read signal from a record mark that is more than $\lambda$/NA apart from both the preceding one and the following one in the recording direction along the track is equal to or less than five times (about 14 dB), preferably less than three times (about 9.5 dB), the amplitude of the read signal from a record mark that does not meet the above-mentioned record mark spacing conditions; or the carrier to noise ratio of the read signal from a record mark that is more than $\lambda$/NA apart from both the preceding one and the following one in the recording direction along the track is less than the carrier to noise ratio of the read signal from a record mark that does not meet the above-mentioned record mark spacing conditions; or when a record mark that is more than $\lambda$/NA apart from both the preceding one and the following one in the recording direction along the track is overwritten by a record mark that does not meet the above-mentioned record mark spacing conditions, the amplitude of the read signal from the latter record mark is equal to or larger than five times (about 14 dB), preferably seven times (about 17 dB), the amplitude of the read signal from the remainder of the former record mark that has been erased by the overwriting process; or the recorded area of a record mark that is more than $\lambda$/NA apart from both the preceding one and the following one in the recording direction along the track is less than the recorded area of a record mark that does not meet the above-mentioned record mark spacing conditions.

The inventors have found that such an amplitude of read signals and such a carrier to noise ratio can only be achieved by means of a special layer structure.

In view of this point, in the case of pit position recording, the heat interference among marks can be used within a range where jitter and other characteristics will not deteriorate. The thickness of the recording layer should be as large as possible if heat interference is within such a range. From the viewpoint of the light absorption, on the other hand, the thickness of the recording layer should be as small as possible in order to reduce the light absorption by the recording layer in the amorphous state so that the difference in light absorption between the amorphous state and the crystalline state is minimized. Taking both considerations into account, the thickness of the recording layer is preferably in the range of 15–45 nm, preferably 20–45 nm.

In the case of mark-edge recording, on the other hand, a shift of the recording layer is more likely to occur during the recording and erasing processes as compared to pit position recording. The degree of cooling of the recording layer during the recording process has to be increased to prevent this shift, indicating that the thickness of the recording layer should be as small as possible within the above-mentioned range. Thus, the thickness is preferably be in the range of 10–35 nm, more preferably 10–30 nm.

To maximize the high recording sensitivity, to permit one-beam overwriting, and to achieve good erasing characteristics with a large erase ratio, the main part of an optical recording medium is preferably be constituted as follows.

An alloy that contains at least the three elements of Ge, Sb, and Te should be used as material for the recording layer, and in the case of Item 1 and Item 7, the thickness of the first dielectric layer should meet the following equations:

$$N\lambda/4 - 0.2\lambda \leq ndl \leq N\lambda/4 + 0.2\lambda$$

$$10 \leq dr \leq 45 \ (nm)$$

$$1 \leq d_2 \leq 50 (nm)$$

$$1 \leq dh \leq 100 (nm)$$

$$10 \leq da \leq 200 (nm)$$

where dl denotes the thickness of the first dielectric layer, n the refractive index of the first dielectric layer, N an integer of 1, 3, or 5, $\lambda$ the laser beam wave length used for recording, dr the thickness of the recording layer, $d_2$ the thickness of the second dielectric layer, and dh the thickness of the light absorbing layer, and in the case of Item 1, da denotes the thickness of the reflecting layer.

In the case of Item 2 and Item 8 the thickness preferably meet the following equations:

$$N\lambda/4-0.2\lambda \leq ndl \leq N\lambda/4+0.2\lambda$$

$$10 \leq dr \leq 45 (nm)$$

$$1 \leq d_2 < 30 (nm)$$

$$25 \leq dh \leq 200 (nm)$$

In particular, the dielectric layer preferably consist of a mixture of at least Zn and $SiO_2$, with the content of $SiO_2$ being 15–35 mol.%, and the composition of the recording layer is preferably in the range described by the following equations.

In addition, the composition of the recording layer is preferably in the range described by the following equations:

$$M_z(Sb_xTe_{1-x})_{1-y-z}(Ge_{0.5}Te_{0.5})y$$

$$0.35 \leq x \leq 0.5$$

$$0.2 \leq y \leq 0.5$$

$$0.0005 \leq z \leq 0.01$$

In these equations, M denotes at least one metal selected from the group of palladium, niobium, platinum, silver, gold, and cobalt, and Sb, Te, and Ge denote niobium, tellurium, and germanium, respectively. Further, x, y, z, and numbers show the number of the relevant element (number of moles of the element).

The useful materials for the substrate include various types of transparent resin and transparent glass. To eliminate the effect of dust and flaws on the substrate, it is desirable to use a transparent substrate and a convergent laser beam that is applied from the substrate side to perform recording. Such transparent substrate materials include glass polycarbonate, polymethyl methacrylate, polyolefin resin, epoxy resin, and polyimide. Polycarbonate resin and amorphous polyolefin resin are particularly useful because they are small in optical birefringence, low in moisture absorption, and easy to mold.

There are no limitations on the thickness of the substrate, but a thickness of 0.01–5 mm is practical. If it is less than 0.01 mm, recording may be affected by dust even when a convergent beam is applied from the substrate side for recording. If it is more than 5 mm, it becomes difficult to use an objective lens with a large numerical aperture, and a large beam spot size has to be used, making it difficult to increase the record density.

The substrate may be flexible or rigid. A flexible substrate may be in the form of tape, a sheet, or a card. A rigid substrate may be in the form of a car or disk. Two such substrates, provided with a recording layer etc., may be combined into an air sandwich structure, air incident structure, or a close-contact laminate structure.

A light source used for recording on the optical recording media of the invention should be a high-intensity one such as laser or stroboscope. Semiconductor laser is particularly useful because of its small source size, small power consumption, and easy modulation.

To record data, laser beam pulses etc. are applied to a crystalline recording layer to produce amorphous record marks. Contrary to this, crystalline record marks may be produced on an amorphous layer. To erase the data, a laser beam is applied to transform the amorphous record marks into the crystalline state or transform the crystalline record marks into the amorphous state.

A design where recording is carried out by producing amorphous marks which are crystallized for erasing is preferable because recording can be performed more rapidly and because the recording layer is less unlikely to suffer distortion.

Because of a short required time for rewriting, it is desirable to use the one-beam overwriting method where high- and low-intensity light is used for producing and erasing record marks, respectively, to allow rewriting to be achieved by applying light only once.

Methods for producing optical recording media of the invention are described below.

Some known methods for producing thin film in a vacuum, including vacuum deposition, ion plating, and sputtering, can be used to form a recording layer, light absorbing layer, reflecting layer, etc., on a substrate. Sputtering is particularly useful because the composition and thickness of the film can be controlled easily.

The thickness of the recording layer etc. to be formed can be easily controlled by monitoring the build-up with a known technique such as a quartz-oscillator film thickness gauge.

The formation of the recording layer etc. may be performed with the substrate being fixed, conveyed, or rotated. The substrate should rotate on its axis, preferably while revolving around an axis outside the subject, to achieve a uniform film thickness.

Prior to actual recording of data, the recording layer should be crystallized by applying light from laser equipment, xenon flash lamp, etc.

To further illustrate this invention, the following examples are given.

(Methods for Analysis and Measurement)

An ICP emission spectrometer (Seiko Electronics Inc.) is used to determine the composition of the reflecting layer, recording layer, and light absorbing layer. The C/N ratio and erase ratio (degree of difference in amplitude of signals read after recording and after erasing) are measured with a spectrum analyzer.

Changes in the thickness of the recording layer, dielectric layer, light absorbing layer, and reflecting layer during their formation are monitored with a quartz-oscillator film thickness gauge. The thickness of each layer is determined from observations of their cross sections made with a scanning or transmission electron microscope.

The heat conductivity and optical constants of the light absorbing layer are measured by the methods describe previously.

EXAMPLE 1

A recording layer, dielectric layer, light absorbing layer, and reflecting layer are formed by high-frequency sputtering over a polycarbonate substrate 0.6 mm in thickness, 8.6 cm in diameter provided with a spiral groove of a 1.0 $\mu$m pitch. The substrate is rotated at 30 rpm during the sputtering process.

To do this, a vacuum container is evacuated to $1\times10^{-5}$ Pa, followed by the sputtering of ZnS containing 20 mol.% $SiO_2$ in an Ar gas atmosphere of $2\times10-1$ Pa to form a 80 nm thick first dielectric layer on the substrate. Subsequently, a ternary alloy with a composition of about $Ge_{0.18}Sb_{0.26}Te_{0.56}$ is sputtered with a composite target having small pieces of Nb and Pb on it to form a 30 nm thick recording layer with a composition of $Pd_{0.002}Nb_{0.003}Ge_{0.175}Sb_{0.26}Te_{0.56}$. A second dielectric layer of the same material as the first dielectric layer is then formed up to a thickness of 10 nm, followed by its sputtering with a Ti target to produce a 20 nm thick light absorbing layer. Finally, an alloy of $Hf_{0.02}Pd_{0.002}Al_{0.978}$ is sputtered to form a 100 nm thick reflecting layer.

After removing the disk out of the vacuum container, the reflecting layer is spin-coated with ultraviolet-curing acrylic resin (Dainippon Ink & Chemicals, Inc., SD-101), and it is cured by applying ultraviolet light to form a 10 $\mu$m thick resin layer, thus obtaining an optical recording medium of the present invention. It is then adhered to a similar disk produced in the same way with a hot-melt adhesive (Toa Synthetic Chemistry Industrials Co., Ltd., VW30) to form a double-sided disk.

A semiconductor laser beam with a wave length of 820 nm is applied to this optical recording medium, and the whole area of the recording layer of the disk is crystallized for initialization.

The light absorption of the disk in the amorphous state and the crystalline state is calculated from the optical constant and thickness of each layer at 69% and 68%, respectively, for light with a 680 nm wavelength, indicating that the light absorption is nearly the same for the amorphous state and the crystalline state. The calculated optical reflectance for the crystalline state is 22%, which agrees well with measurements made for the disk to confirm the validity of calculations.

While rotating the disk at a rotation speed of 3600 rpm, data on the track at a radius of 39 mm are repeatedly overwritten 100 times with a semiconductor laser beam modulated to a peak power of 8–15 mW and bottom power of 3–8 mW at a frequency of 5.73 MHz (pulse width 20 ns) by using an optical head that is 0.6 in the numerical aperture of the objective lens and 680 nm in the wave length of the semiconductor laser beams. Then, while applying a semiconductor beam with a read power of 1.2 mW, the C/N ratio is determined under the condition of 30 kHz band width.

Furthermore, while one-beam overwriting is performed by exposing this portion to a 15.3 MHz (20 ns pulse width) semiconductor laser beam modulated as described above, the erase ratio for the record marks formed previously with a 5.73 MHz beam is measured. A C/N ratio of 45–49 dB is obtained at a peak power of 10–15 mW and an erase ratio of 18–21 dB is achieved at a bottom power of 4–5 mW.

In addition, one-beam overwriting is repeated 10,000 times under the conditions of a peak power of 10.5 mW, bottom power of 5 mW, and frequency of 5.73 MHz, followed by the same measuring process. The changes in the erase ratio are within 2 dB, showing no significant deterioration.

The recorded data are read after allowing the optical recording medium to stand at a temperature of 80° C. and relative humidity of 80% for 1,000 hours. The changes in the C/N ratio are within a very small range of 2 dB. The C/N ratio and erase ratio are measured after recording and erasing data again, but no significant changes are seen as in the above case.

EXAMPLE 2

A recording layer, dielectric layer, light absorbing layer, and reflecting layer with the same compositions as in Example 1 are formed by using a polycarbonate substrate 1.2 mm in thickness, 13 cm in diameter provided with a spiral groove of a 1.6 $\mu$m pitch.

The thickness of the first dielectric layer, recording layer, second dielectric layer, light absorbing layer, and reflecting layer is 130 nm, 25 nm, 15 nm, 20 nm, and 150 nm, respectively.

The light absorption of the disk in the amorphous state and the crystalline state is calculated from the optical constant and thickness of each layer at 68% and 64%, respectively, for light with a 780 nm wavelength, indicating that the light absorption is nearly the same for the amorphous state and the crystalline state. The calculated optical reflectance for the crystalline state is 30%, which agrees well with measurements of the disk to confirm the validity of calculations.

While rotating the disk at a linear velocity of 11.3 m/sec, data are repeatedly overwritten 100 times with a semiconductor laser beam modulated to a peak power of 13–17 mW and bottom power of 6–12 mW at a frequency of 3.70 MHz (duty 45%) by using an optical head that is 0.5 in the numerical aperture of the objective lens and 780 nm in the wave length of the semiconductor laser beams. Then, while applying a semiconductor beam with a read power of 1.3 mW, the C/N ratio is determined under the condition of 30 kHz band width. Furthermore, while one-beam overwriting is performed by exposing this portion to a 2.12 MHz (duty 45%) semiconductor laser beam modulated as described above, measurements are made of the erase ratio for the record marks formed previously with a 5.73 MHz as well as the jitter at the rear edge of read signals from the record marks. A C/N ratio of 50–58 dB, which is within a practically useful range, is obtained at a peak power of 15–17 mW and an erase ratio of 25–28 dB, which is also within a practically useful range, is achieved at a bottom power of 7–11 mW. The jitter ([sigma]) during overwriting at a bottom power of 9 mW is 3.0 ns.

In addition, one-beam overwriting is repeated 10,000 times under the conditions of a peak power of 17 mW, bottom power of 9 mW, and frequency of 3.70 MHz, followed by the same measuring process. The changes in the erase ratio are within 2 dB, showing no significant deterioration.

The recorded data are read after allowing the optical recording medium to stand at a temperature of 80° C. and relative humidity of 80% for 1,000 hours. The changes in the C/N ratio are within a very small range of 2 dB. The C/N ratio and erase ratio are measured after recording and erasing data again, but no significant changes are seen as in the above case.

EXAMPLE 3

A disk with the same constitution as in Example 2 except that the composition of the recording layer is $Nb_{0.005}Ge_{0.175}Sb_{0.26}Te_{0.56}$ is produced. Both calculations and measurements of the light absorption of this disk in the amorphous state and the crystalline state are the same as those in Example 2. Measurements are made in a similar way as in Example 2, and similar results are obtained.

EXAMPLE 4

A recording layer, dielectric layer, light absorbing layer, and reflecting layer are formed by high-frequency sputtering over a polycarbonate substrate 0.6 mm in thickness, 8.6 cm in diameter provided with a spiral groove of a 1.0 $\mu$m pitch. The substrate is rotated at 30 rpm during the sputtering process.

To do this, a vacuum container is evacuated to $1 \times 10^{-5}$ Pa, followed by the sputtering of ZnS containing 20 mol.% $SiO_2$ in an Ar gas atmosphere of $2 \times 10^{-1}$ Pa to form a 230 nm thick first dielectric layer on the substrate. Subsequently, a ternary alloy with a composition of about $Ge_{0.18}Sb_{0.26}Te_{0.56}$ is sputtered with a composite target having small pieces of Nb and Pd on it to form a 20 nm thick recording layer with a composition of $Pd_{0.002}Nb_{0.003}Ge_{0.175}Sb_{0.26}Te_{0.56}$. A second dielectric layer of the same material as the first dielectric layer is then formed up to a thickness of 12 nm, followed by its sputtering with a Nb target to produce a 40 nm thick light absorbing layer. The material of the light absorbing layer in its bulk state has a heat conductivity of 54 W/m·K. Finally, an alloy of $Hf_{0.02}Pd_{0.002}Al_{0.978}$ is sputtered to form a 40 nm thick reflecting layer.

After removing the disk out of the vacuum container, the reflecting layer is spin-coated with ultraviolet-curing acrylic resin (Dainippon Ink & Chemicals, Inc., SD-101), and it is cured by applying ultraviolet light to form a 10 $\mu$m thick resin layer, thus obtaining an optical recording medium of the present invention. It is then adhered to a similar disk produced in the same way with a hot-melt adhesive (Toa Synthetic Chemistry Industrials Co., Ltd., VW30) to form a double-sided disk.

A semiconductor laser beam with a wave length of 820 nm is applied to this optical recording medium, and the whole area of the recording layer of the disk is crystallized for initialization.

According to the previously cited "Handbook of Optical Constants of Solids II", the optical constants of Nb, the material of the light absorbing layer, include the refractive index and the extinction coefficient for a wave length of 780 nm of 2.7 and 2.9, respectively.

The light absorption of the disk in the amorphous state and the crystalline state is calculated from the optical constant and thickness of each layer at 61% and 66%, respectively, for light with a 680 nm wavelength, indicating that the light absorption for the crystalline state is larger than that for the amorphous state. The calculated optical reflectance for the crystalline state is 21%, which agrees well with measurements made for the disk to confirm the validity of calculations.

While rotating the disk at a rotation speed of 3600 rpm, data on the track at a radius of 39 mm are repeatedly overwritten 100 times with a semiconductor laser beam modulated to a peak power of 8–15 mW and bottom power of 3–8 mW at a frequency of 5.73 MHz (pulse width 20 ns) by using an optical head that is 0.6 in the numerical aperture of the objective lens and 680 nm in the wave length of the semiconductor laser beams. Then, while applying a semiconductor beam with a read power of 1.2 mW, the C/N ratio is determined under the condition of 30 kHz band width.

Furthermore, while one-beam overwriting is performed by exposing this portion to a 15.3 MHz (20 ns pulse width) semiconductor laser beam modulated as described above, the erase ratio for the record marks formed previously with a 5.73 MHz beam is measured. A C/N ratio of 50 dB or more is obtained at a peak power of 9–14 mW and an erase ratio of 20 dB or more is achieved at a bottom power of 4–6 mW.

In addition, one-beam overwriting is repeated 10,000 times under the conditions of a peak power of 12 mW, bottom power of 6 mW, and frequency of 15.3 MHz, followed by the same measuring process. The changes in the erase ratio are within 2 dB, showing no significant deterioration.

EXAMPLE 5

A recording layer, dielectric layer, and reflecting layer with the same compositions as in Example 4 are formed by using a polycarbonate substrate 1.2 mm in thickness, 13 cm in diameter provided with a spiral groove of a 1.6 $\mu$m pitch. A light absorbing layer is formed by sputtering a Nb target.

The thickness of the first dielectric layer, recording layer, second dielectric layer, light absorbing layer, and reflecting layer is 260 nm, 35 nm, 10 nm, 40 nm, and 90 nm, respectively.

According to the previously cited "Handbook of Optical Constants of Solids II", the optical constants of Nb, the material of the light absorbing layer, include the refractive index and the extinction coefficient for a wave length of 780 nm of 2.2 and 3.3, respectively.

The light absorption of the disk in the amorphous state and the crystalline state is calculated from the optical constant and thickness of each layer at 66% and 66%, respectively, for light with a 780 nm wavelength, indicating that the light absorption is the same for the amorphous state and the crystalline state. The calculated optical reflectance for the crystalline state is 26%, which agrees well with measurements made for the disk to confirm the validity of calculations.

While rotating the disk at a linear velocity of 11.3 m/sec, data are repeatedly overwritten 100 times with a semiconductor laser beam modulated to a peak power of 13–17 mW and bottom power of 6–12 mW at a frequency of 3.70 MHz (duty 45%) by using an optical head that is 0.5 in the numerical aperture of the objective lens and 780 nm in the wave length of the semiconductor laser beams. Then, while applying a semiconductor beam with a read power of 1.3 mW, the C/N ratio is determined under the condition of 30 kHz band width.

Furthermore, while one-beam overwriting is performed by exposing this portion to a 15.3 MHz (20 ns pulse width) semiconductor laser beam modulated as described above, measurements are made of the erase ratio for the record marks formed previously with a 5.73 MHz as well as the jitter at the rear edge of read signals from the record marks. A C/N ratio of 52 dB or more, which is within a practically useful range, is obtained at a peak power of 15–17 mW and an erase ratio of 22 dB or more, which is also within a practically useful range, is achieved at a bottom power of 6–8 mW. The jitter ([sigma]) during overwriting at a bottom power of 7 mW is 3.5 ns.

In addition, one-beam overwriting is repeated 10,000 times under the conditions of a peak power of 16 mW, bottom power of 7 mW, and frequency of 3.70 MHz, followed by the same measuring process. The changes in the erase ratio are within 2 dB, showing no significant deterioration.

EXAMPLE 6

Using the same substrate as in Example 4, a dielectric layer and reflecting layer with the same compositions as in Example 4 are formed in the same way. The recording layer has a composition of $Nb_{0.005}Ge_{0.175}Sb_{0.26}Te_{0.56}$. The light absorbing layer is formed by sputtering a Nb target as in Example 4. The thickness of the first dielectric layer, recording layer, second dielectric layer, light absorbing layer, and reflecting layer is 240 nm, 30 nm, 5 nm, 50 nm, and 30 nm, respectively.

The light absorption of the disk in the amorphous state and the crystalline state is calculated from the optical constant and thickness of each layer at 64% and 66%, respectively, for light with a 680 nm wavelength, indicating that the light absorption is nearly the same for the amorphous state and the crystalline state. The calculated optical reflectance for the crystalline state is 26%, which agrees well with measurements made for the disk to confirm the validity of calculations.

Then, the C/N ratio and erase ratio are measured in the same way as in Example 4, showing that the C/N ratio is 50 dB or more at a peak power of 10–15 mW and that the erase ratio is 20 dB or more at a bottom power of 5–7 mW.

In addition, one-beam overwriting is repeated 10,000 times under the conditions of a peak power of 13.0 mW, bottom power of 6 mW, and frequency of 15.3 MHz, followed by the same measuring process. The changes in the erase ratio are within 2 dB, showing no significant deterioration.

EXAMPLE 7

Using the same substrate as in Example 4, a recording layer, dielectric layer and reflecting layer with the same compositions as in Example 4 are formed in the same way. The light absorbing layer is formed by sputtering a W target. The material of the light absorbing layer in its bulk state has a heat conductivity of 178 W/m·K. The thickness of the first dielectric layer, recording layer, second dielectric layer, light absorbing layer, and reflecting layer is 220 nm, 20 nm, 8 nm, 40 nm, and 50 nm, respectively.

According to the previously cited "Handbook of Optical Constants of Solids II", the optical constants of W, the material of the light absorbing layer, include the refractive index and the extinction coefficient for a wave length of 680 nm of 3.8 and 2.9, respectively.

The light absorption of the disk in the amorphous state and the crystalline state is calculated from the optical constant and thickness of each layer at 50% and 58%, respectively, for light with a 680 nm wavelength, indicating that the light absorption for the crystalline state is larger than that for the amorphous state. The calculated optical reflectance for the crystalline state is 22%, which agrees well with measurements made for the disk to confirm the validity of calculations.

Then, the C/N ratio and erase ratio are measured in the same way as in Example 4, showing that the C/N ratio is 50 dB or more at a peak power of 12–15 mW and that the erase ratio is 20 dB or more at a bottom power of 5–7 mW.

In addition, one-beam overwriting is repeated 10,000 times under the conditions of a peak power of 13 mW, bottom power of 6 mW, and frequency of 15.3 MHz, followed by the same measuring process. The changes in the erase ratio are within 2 dB, showing no significant deterioration.

EXAMPLE 8

Using the same substrate as in Example 4, a recording layer, dielectric layer and reflecting layer with the same compositions as in Example 4 are formed in the same way. The thickness of the first dielectric layer, recording layer, second dielectric layer, light absorbing layer, and reflecting layer is 230 nm, 30 nm, 5 nm, 40 nm, and 30 nm, respectively.

The light absorption of the disk in the amorphous state and the crystalline state is calculated from the optical constant and thickness of each layer at 57% and 62%, respectively, for light with a 680 nm wavelength, indicating that the light absorption for the crystalline state is larger than that for the amorphous state. The calculated optical reflectance for the crystalline state is 26%, which agrees well with measurements made for the disk to confirm the validity of calculations.

Then, the C/N ratio and erase ratio are measured in the same way as in Example 4, showing that the C/N ratio is 50 dB or more at a peak power of 10–15 mW and that the erase ratio is 20 dB or more at a bottom power of 4–7 mW.

In addition, one-beam overwriting is repeated 10,000 times under the conditions of a peak power of 12.0 mW, bottom power of 5 mW, and frequency of 15.3 MHz, followed by the same measuring process. The changes in the erase ratio are within 2 dB, showing no significant deterioration.

EXAMPLE 9

Using the same substrate as in Example 4, a recording layer, dielectric layer and reflecting layer with the same compositions as in Example 4 are formed in the same way. The light absorbing layer is formed by sputtering a Mo target. The material of the light absorbing layer in its bulk state has a heat conductivity of 138 W/m·K. The thickness of the first dielectric layer, recording layer, second dielectric layer, light absorbing layer, and reflecting layer is 70 nm, 35 nm, 5 nm, 25 nm, and 70 nm, respectively.

According to the previously cited "Handbook of Optical Constants of Solids II", the optical constants of Mo, the material of the light absorbing layer, include the refractive index and the extinction coefficient for a wave length of 680 nm of 3.8 and 3.6, respectively.

The light absorption of the disk in the amorphous state and the crystalline state is calculated from the refractive index and thickness of each layer at 63% and 66%, respectively, for light with a 680 nm wavelength, indicating that the light absorption is nearly the same for the amorphous state and the crystalline state. The calculated optical reflectance for the crystalline state is 27%, which agrees well with measurements made for the disk to confirm the validity of calculations.

Then, the C/N ratio and erase ratio are measured in the same way as in Example 4, showing that the C/N ratio is 50 dB or more at a peak power of 11–15 mW and that the erase ratio is 20 dB or more at a bottom power of 4–6 mW.

In addition, one-beam overwriting is repeated 10,000 times under the conditions of a peak power of 13.0 mW, bottom power of 5 mW, and frequency of 15.3 MHz, followed by the same measuring process. The changes in the erase ratio are within 2 dB, showing no significant deterioration.

EXAMPLE 10

Using the same substrate as in Example 4, a dielectric layer and reflecting layer with the same compositions as in Example 4 are formed in the same way. The recording layer has a composition of $Nb_{0.005}Ge_{0.175}Sb_{0.26}Te_{0.56}$. The light absorbing layer is formed by sputtering a Mo target. The thickness of the first dielectric layer, recording layer, second dielectric layer, light absorbing layer, and reflecting layer is 220 nm, 20 nm, 10 nm, 40 nm, and 50 nm, respectively.

The light absorption of the disk in the amorphous state and the crystalline state is calculated from the optical constant and thickness of each layer at 54% and 61%, respectively, for light with a 680 nm wavelength, indicating that the light absorption for the crystalline state is larger than that for the amorphous state. The calculated optical reflectance for the crystalline state is 20%, which agrees well with measurements made for the disk to confirm the validity of calculations.

Then, the C/N ratio and erase ratio are measured in the same way as in Example 4, showing that the C/N ratio is 50 dB or more at a peak power of 10–14 mW and that the erase ratio is 20 dB or more at a bottom power of 5–7 mW.

In addition, one-beam overwriting is repeated 10,000 times under the conditions of a peak power of 12 mW, bottom power of 6 mW, and frequency of 15.3 MHz, followed by the same measuring process. The changes in the erase ratio are within 2 dB, showing no significant deterioration.

EXAMPLE 11

A recording layer, dielectric layer, and light absorbing layer are formed by high-frequency sputtering over a polycarbonate substrate 0.6 mm in thickness, 8.6 cm in diameter provided with a spiral groove of a 1.0 µm pitch. The substrate is rotated at 30 rpm during the sputtering process.

To do this, a vacuum container is evacuated to $1 \times 10^{-5}$ Pa, followed by the sputtering of ZnS containing 20 mol.% $SiO_2$ in an Ar gas atmosphere of $2 \times 10^{-1}$ Pa to form a 230 nm thick first dielectric layer on the substrate. Subsequently, a ternary alloy with a composition of about $Ge_{0.18}Sb_{0.26}Te_{0.56}$ is sputtered with a composite target having small pieces of Nb and Pd on it to form a 20 nm thick recording layer with a composition of $Pd_{0.002}Nb_{0.003}Ge_{0.175}Sb_{0.26}Te_{0.56}$. A second dielectric layer of the same material as the first dielectric layer is then formed up to a thickness of 5 nm, followed by its sputtering with a Nb target to produce a 60 nm thick light absorbing layer. The material of the light absorbing layer in its bulk state has a heat conductivity of 54 W/m·K.

After removing the disk out of the vacuum container, the light absorbing layer is spin-coated with ultraviolet-curing acrylic resin (Dainippon Ink & Chemicals, Inc., SD-101), and it is cured by applying ultraviolet light to form a 10 µm thick resin layer, thus obtaining an optical recording medium of the present invention. It is then adhered to a similar disk produced in the same way with a hot-melt adhesive (Toa Synthetic Chemistry Industrials Co., Ltd., VW30) to form a double-sided disk.

A semiconductor laser beam with a wave length of 820 nm is applied to this optical recording medium, and the whole area of the recording layer of the disk is crystallized for initialization.

According to the previously cited "Handbook of Optical Constants of Solids II", the optical constants of Nb, the material of the light absorbing layer, include the refractive index and the extinction coefficient for a wave length of 680 nm of 2.7 and 2.9, respectively.

The light absorption of the disk in the amorphous state and the crystalline state is calculated from the optical constant and thickness of each layer at 53% and 63%, respectively, for light with a 680 nm wavelength, indicating that the light absorption for the crystalline state is larger than that for the amorphous state. The calculated optical reflectance for the crystalline state is 21%, which agrees well with measurements made for the disk to confirm the validity of calculations.

While rotating the disk at a rotation speed of 3600 rpm, data on the track at a radius of 39 mm are repeatedly overwritten 100 times with a semiconductor laser beam modulated to a peak power of 8–15 mW and bottom power of 3–8 mW at a frequency of 5.73 MHz (pulse width 20 ns) by using an optical head that is 0.6 in the numerical aperture of the objective lens and 680 nm in the wave length of the semiconductor laser beams. Then, while applying a semiconductor beam with a read power of 1.2 mW, the C/N ratio is determined under the condition of 30 kHz band width.

Furthermore, while one-beam overwriting is performed by exposing this portion to a 15.3 MHz (20 ns pulse width) semiconductor laser beam modulated as described above, the erase ratio for the record marks formed previously with a 5.73 MHz beam is measured. A C/N ratio of 49 dB or more is obtained at a peak power of 10–15 mW and an erase ratio of 20 dB or more is achieved at a bottom power of 5–7 mW.

In addition, one-beam overwriting is repeated 10,000 times under the conditions of a peak power of 12.0 mW, bottom power of 6.0 mW, and frequency of 15.3 MHz, followed by the same measuring process. The changes in the erase ratio are within 2 dB, showing no significant deterioration.

EXAMPLE 12

A recording layer and dielectric layer, and reflecting layer with the same compositions as in Example 11 are formed by using a polycarbonate substrate 1.2 mm in thickness, 13 cm in diameter provided with a spiral groove of a 1.6 µm pitch. A light absorbing layer is formed by sputtering a W target. The thickness of the first dielectric layer, recording layer, second dielectric layer, and light absorbing layer is 230 nm, 20 nm, 10 nm, and 50 nm, respectively.

According to the previously cited "Handbook of optical Constants of Solids II", the optical constants of W, the material of the light absorbing layer, include the refractive index and the extinction coefficient for a wave length of 680 nm of 3.8 and 2.9, respectively.

The light absorption of the disk in the amorphous state and the crystalline state is calculated from the refractive index and thickness of each layer at 53% and 62%, respectively, for light with a 680 nm wavelength, indicating that the light absorption for the crystalline state is larger than that for the amorphous state. The calculated optical reflectance for the crystalline state is 20%, which agrees well with measurements made for the disk to confirm the validity of calculations.

Then, the C/N ratio and era se ratio are measured in the same way as in Example 11, showing that the C/N ratio is 50 dB or more at a peak power of 9–15 mW and that the erase ratio is 20 dB or more at a bottom power of 5–7 mW. The jitter ([sigma]) during overwriting at a bottom power of 6 mW is 4.2 ns.

In addition, one-beam overwriting is repeated 10,000 times under the conditions of a peak power of 12 mW, bottom power of 6 mW, and frequency of 15.3 MHz, followed by the same measuring process. The changes in the erase ratio are within 2 dB, showing no significant deterioration.

EXAMPLE 13

Using the same substrate as in Example 11, dielectric layers with the same compositions as in Example 11 are formed in the same way. The recording layer has a composition of $Nb_{0.005}Ge_{0.175}Sb_{0.26}Te_{0.56}$. The light absorbing layer is formed by sputtering a Nb target. The thickness of the first dielectric layer, recording layer, second dielectric layer, and light absorbing layer is 230 nm, 30 nm, 10 nm, and 60 nm, respectively.

The light absorption of the disk in the amorphous state and the crystalline state is calculated from the optical constant and thickness of each layer at 63% and 64%, respectively, for light with a 680 nm wavelength, indicating that the light absorption is nearly the same for the amorphous state and the crystalline state. The calculated optical reflectance for the crystalline state is 27%, which agrees well with measurements made for the disk to confirm the validity of calculations.

Then, the C/N ratio and erase ratio are measured in the same way as in Example 11, showing that the C/N ratio is 50 dB or more at a peak power of 13–15 mW and that the erase ratio is 20 dB or more at a bottom power of 4–6 mW.

In addition, one-beam overwriting is repeated 10,000 times under the conditions of a peak power of 13 mW, bottom power of 5 mW, and frequency of 15.3 MHz, followed by the same measuring process. The changes in the erase ratio are within 2 dB, showing no significant deterioration.

EXAMPLE 14

Using the same substrate as in Example 11, dielectric layers with the same compositions as in Example 11 are formed in the same way. The recording layer has a composition of $Nb_{0.005}Ge_{0.175}Sb_{0.26}Te_{0.56}$. The light absorbing layer is formed by sputtering a W target. The material of the light absorbing layer in its bulk state has a heat conductivity of 178 W/m·K. The thickness of the first dielectric layer, recording layer, second dielectric layer, and light absorbing layer is 230 nm, 30 nm, 5 nm, and 40 nm, respectively.

The light absorption of the disk in the amorphous state and the crystalline state is calculated from the optical constant and thickness of each layer at 59% and 63%, respectively, for light with a 680 nm wavelength, indicating that the light absorption for the crystalline state is larger than that for the amorphous state. The calculated optical reflectance for the crystalline state is 25%, which agrees well with measurements made for the disk to confirm the validity of calculations.

Then, the C/N ratio and erase ratio are measured in the same way as in Example 11, showing that the C/N ratio is 50 dB or more at a peak power of 12–15 mW and that the erase ratio is 20 dB or more at a bottom power of 4–6 mW.

In addition, one-beam overwriting is repeated 10,000 times under the conditions of a peak power of 12 mW, bottom power of 5 mW, and frequency of 15.3 MHz, followed by the same measuring process. The changes in the erase ratio are within 2 dB, showing no significant deterioration.

EXAMPLE 15

Using the same substrate as in Example 11, dielectric layers with the same compositions as in Example 11 are formed in the same way. The recording layer has a composition of $Nb_{0.005}Ge_{0.175}Sb_{0.26}Te_{0.56}$. The light absorbing layer is formed by sputtering a Mo target. The material of the light absorbing layer in its bulk state has a heat conductivity of 138 W/m·K. The thickness of the first dielectric layer, recording layer, second dielectric layer, and light absorbing layer is 70 nm, 35 nm, 5 nm, and 40 nm, respectively.

According to the previously cited "Handbook of Optical Constants of Solids II", the optical constants of Mo, the material of the light absorbing layer, include the refractive index and the extinction coefficient for a wave length of 680 nm of 3.8 and 3.6, respectively.

The light absorption of the disk in the amorphous state and the crystalline state is calculated from the optical constant and thickness of each layer at 65% and 66%, respectively, for light with a 680 nm wavelength, indicating that the light absorption is nearly the same for the amorphous state and the crystalline state. The calculated optical reflectance for the crystalline state is 27%, which agrees well with measurements made for the disk to confirm the validity of calculations.

Then, the C/N ratio and erase ratio are measured in the same way as in Example 11, showing that the C/N ratio is 50 dB or more at a peak power of 11–14 mW and that the erase ratio is 20 dB or more at a bottom power of 3–5 mW.

In addition, one-beam overwriting is repeated 10,000 times under the conditions of a peak power of 11 mW, bottom power of 4 mW, and frequency of 15.3 MHz, followed by the same measuring process. The changes in the erase ratio are within 2 dB, showing no significant deterioration.

EXAMPLE 16

A recording layer, dielectric layer, light absorbing layer, and a reflecting layer are formed by high-frequency sputtering over a polycarbonate substrate 0.6 mm in thickness, 8.6 cm in diameter provided with a spiral groove of a 1.0 μm pitch. The substrate is rotated at 30 rpm during the sputtering process.

To do this, a vacuum container is evacuated to $1 \times 10^{-5}$ Pa, followed by the sputtering of ZnS containing 20 mol.% $SiO_2$ in an Ar gas atmosphere of $2 \times 10^{-1}$ Pa to form a 220 nm thick first dielectric layer with a refractive index of about 2.2 on the substrate. Subsequently, an alloy target consisting of Pd, Nb, Ge, Sb, and Te is sputtered to form a 21 nm thick recording layer with a composition of $Pd_{0.2}Nb_{0.3}Ge_{18.5}Sb_{27}Te_{54}$ (atomic %). A second dielectric layer of the same material as the first dielectric layer is then formed up to a thickness of 8 nm, followed by the production of a 40 nm thick light absorbing layer of a $W_{74}Y_{26}$ (atomic %) alloy on the second dielectric layer. Further, a 60 nm thick reflecting layer of a $Hf_{0.02}Pd_{0.002}Al_{0.978}$ alloy is formed.

After removing this optical recording medium out of the vacuum container, the reflecting layer is spin-coated with ultraviolet-curing acrylic resin (Dainippon Ink & Chemicals, Inc., SD-101), and it is cured by applying ultraviolet light to form a 10 μm thick resin layer, followed by the adhesion of this medium to a disk with the same constitution with a hot-melt adhesive (Toa Synthetic Chemistry Industrials Co., Ltd., VW30), thus obtaining an optical recording medium of the present invention.

While rotating this optical recording medium at 2400 rpm, a semiconductor laser beam with a wave length of 820 nm converged into an ellipse with its long axis oriented in the radial direction is applied from the substrate side to crystallize the recording layer for initialization.

The optical constants of the $W_{74}Y_{26}$ alloy used as the light absorbing layer include the refractive index and the extinction coefficient for a wave length of 680 nm of 3.6 and 3.6, respectively.

The light absorption of this optical recording medium in the amorphous state and the crystalline state is calculated from the optical constant and thickness of each layer at 50% and 60%, respectively, for light with a 680 nm wavelength, indicating that the light absorption for the crystalline state is larger than that for the amorphous state. The calculated optical reflectance for the crystalline state is 22%, which agrees well with measurements made for the disk to confirm the validity of calculations.

While rotating this optical recording medium at a rotation speed of 3600 rpm, data on the track at a radius of 39 mm are repeatedly overwritten 100 times with a semiconductor laser beam modulated to a peak power of 8–15 mW and bottom power of 3–8 mW at a frequency of 15.3 MHz (pulse width 20 nsec) by using an optical head that is 0.6 in the numerical aperture of the objective lens and 680 nm in the wave length of the semiconductor laser beams. Then, while applying a semiconductor beam with a read power of 1.2 mW, the C/N ratio is determined under the condition of 30 kHz band width.

Furthermore, while one-beam overwriting is performed by exposing this portion to a 5.73 MHz (pulse width 20 nsec) semiconductor laser beam modulated as described above to a peak power of 8–15 mW and a bottom power of 3–8 mW, and then the erase ratio for the record marks formed previously with a 5.73 MHz beam is measured.

A C/N ratio of 50 dB or more is obtained at a peak power of 11–14 mW, and an erase ratio of 20 dB or more is achieved at a bottom power of 4–6 mW, with the maximum erase ratio obtained being 23 dB.

In addition, one-beam overwriting is repeated 10,000 times under the conditions of a peak power of 12 mW, bottom power of 5 mW, and frequency of 15.3 MHz, followed by the same measuring process. The changes in the erase ratio are within 2 dB, showing no significant deterioration.

EXAMPLE 17

An optical recording media similar to the one in Example 16 except that the thickness of the recording layer, second dielectric layer, and reflecting layer is 20 nm, 10 nm, and 50 nm, respectively, and that a $Y_{24}Mo_{76}$ alloy is used as the material for the light absorption layer is produced.

The optical constants of the $Y_{24}Mo_{76}$ alloy used as the light absorbing layer include the refractive index and the extinction coefficient for a wave length of 680 nm of 3.7 and 3.7, respectively.

The light absorption of this optical recording medium in the amorphous state and the crystalline state is calculated from the optical constant and thickness of each layer at 56% and 61%, respectively, for light with a 680 nm wavelength, indicating that the light absorption for the crystalline state is larger than that for the amorphous state. The calculated optical reflectance for the crystalline state is 24%, which agrees well with measurements made for the disk to confirm the validity of calculations.

The C/N ratio and erase ratio of this optical recording medium is measured in the same as in Example 16. A C/N ratio of 50 dB or more is obtained at a peak power of 10–14 mW, and an erase ratio of 20 dB or more is achieved at a bottom power of 5–1573 6.5 mW, with the maximum erase ratio obtained being 20.5 dB.

In addition, one-beam overwriting is repeated 10,000 times under the conditions of a peak power of 11 mW, bottom power of 5.5 mW, and frequency of 15.3 MHz, followed by the same measuring process. The changes in the erase ratio are within 2 dB, showing no significant deterioration.

EXAMPLE 18

An optical recording media similar to the one in Example 16 except that the thickness of the first dielectric layer, recording layer, second dielectric layer, and reflecting layer is 230 nm, 25 nm, 10 nm, and 50 nm, respectively, and that a Cr38Mo62 alloy is used as the material for the light absorption layer is produced.

The optical constants of the $Cr_{38}Mo_{62}$ alloy used as the light absorbing layer include the refractive index and the extinction coefficient for a wave length of 680 nm of 3.8 and 4.3, respectively.

The light absorption of this optical recording medium in the amorphous state and the crystalline state is calculated from the optical constant and thickness of each layer at 62% and 66%, respectively, for light with a 680 nm wavelength, indicating that the light absorption for the crystalline state is larger than that for the amorphous state. The calculated optical reflectance for the crystalline state is 24%, which agrees well with measurements made for the disk to confirm the validity of calculations.

The C/N ratio and erase ratio of this optical recording medium is measured in the same as in Example 16. A C/N ratio of 50 dB or more is obtained at a peak power of 10–14 mW, and an erase ratio of 20 dB or more is achieved at a bottom power of 4–6 mW, with the maximum erase ratio obtained being 22 dB.

In addition, one-beam overwriting is repeated 10,000 times under the conditions of a peak power of 11 mW, bottom power of 5 mW, and frequency of 15.3 MHz, followed by the same measuring process. The changes in the erase ratio are within 2 dB, showing no significant deterioration.

EXAMPLE 19

An optical recording media similar to the one in Example 16 except that the thickness of the first dielectric layer, recording layer, second dielectric layer, light absorbing layer and reflecting layer is 85 nm, 20 nm, 15 nm, 30 nm, and 70 nm, respectively, and that a $Nb_{31}Mo_{69}$ alloy is used as the material for the light absorption adjusting layer is produced.

The optical constants of the $Nb_{31}Mo_{69}$ alloy used as the light absorbing layer include the refractive index and the extinction coefficient for a wave length of 680 nm of 3.8 and 3.9, respectively.

The light absorption of this optical recording medium in the amorphous state and the crystalline state is calculated from the optical constant and thickness of each layer at 62% and 68%, respectively, for light with a 680 nm wavelength, indicating that the light absorption for the crystalline state is larger than that for the amorphous state. The calculated optical reflectance for the crystalline state is 22%, which agrees well with measurements made for the disk to confirm the validity of calculations.

The C/N ratio and erase ratio of this optical recording medium is measured in the same as in Example 16. A C/N ratio of 50 dB or more is obtained at a peak power of 10–15 mW, and an erase ratio of 20 dB or more is achieved at a bottom power of 4.5–6.5 mW, with the maximum erase ratio obtained being 23 dB.

In addition, one-beam overwriting is repeated 10,000 times under the conditions of a peak power of 12 mW, bottom power of 5.5 mW, and frequency of 15.3 MHz, followed by the same measuring process. The changes in the erase ratio are within 2 dB, showing no significant deterioration.

EXAMPLE 20

An optical recording media similar to the one in Example 16 except that the thickness of the first dielectric layer, recording layer, second dielectric layer, and reflecting layer is 230 nm, 25 nm, 5 nm, and 30 nm, respectively, and that a $Y_{26}W_{74}$ alloy is used as the material for the light absorption layer is produced.

The optical constants of the $Y_{26}W_{74}$ alloy used as the light absorbing layer include the refractive index and the extinction coefficient for a wave length of 680 nm of 3.6 and 3.6, respectively.

The light absorption of this optical recording medium in the amorphous state and the crystalline state is calculated from the optical constant and thickness of each layer at 60% and 66%, respectively, for light with a 680 nm wavelength, indicating that the light absorption for the crystalline state is larger than that for the amorphous state. The calculated optical reflectance for the crystalline state is 25%, which agrees well with measurements made for the disk to confirm the validity of calculations.

The C/N ratio and erase ratio of this optical recording medium is measured in the same as in Example 16. A C/N ratio of 50 dB or more is obtained at a peak power of 11–14 mW, and an erase ratio of 20 dB or more is achieved at a bottom power of 4–5.5 mW, with the maximum erase ratio obtained being 22 dB.

In addition, one-beam overwriting is repeated 10,000 times under the conditions of a peak power of 12 mW, bottom power of 5 mW, and frequency of 15.3 MHz, followed by the same measuring process. The changes in the erase ratio are within 2 dB, showing no significant deterioration.

EXAMPLE 21

An optical recording media similar to the one in Example 16 except that the thickness of the first dielectric layer, recording layer, second dielectric layer, and reflecting layer is 230 nm, 40 nm, 5 nm, and 30 nm, respectively, and that a $Cr_{38}Mo_{62}$ alloy is used as the material for the light absorption layer is produced.

The optical constants of the $Cr_{38}Mo_{62}$ alloy used as the light absorbing layer include the refractive index and the extinction coefficient for a wave length of 680 nm of 3.8 and 4.3, respectively.

The light absorption of this optical recording medium in the amorphous state and the crystalline state is calculated from the optical constant and thickness of each layer at 65% and 68%, respectively, for light with a 680 nm wavelength, indicating that the light absorption for the crystalline state is slightly larger than that for the amorphous state. The calculated optical reflectance for the crystalline state is 27%, which agrees well with measurements made for the disk to confirm the validity of calculations.

The C/N ratio and erase ratio of this optical recording medium is measured in the same as in Example 16. A C/N ratio of 50 dB or more is obtained at a peak power of 12–15 mW, and an erase ratio of 20 dB or more is achieved at a bottom power of 5–7 mW, with the maximum erase ratio obtained being 21 dB.

In addition, one-beam overwriting is repeated 10,000 times under the conditions of a peak power of 13 mW, bottom power of 6 mW, and frequency of 15.3 MHz, followed by the same measuring process. The changes in the erase ratio are within 2 dB, showing no significant deterioration.

EXAMPLE 22

An optical recording media similar to the one in Example 16 except that the thickness of the first dielectric layer, recording layer, second dielectric layer, light absorbing layer and reflecting layer is 230 nm, 30 nm, 10 nm, 25 nm, and 30 nm, respectively, and that a $Y_{26}W_{74}$ alloy is used as the material for the light absorption layer is produced.

The optical constants of the $Y_{26}W_{74}$ alloy used as the light absorbing layer include the refractive index and the extinction coefficient for a wave length of 680 nm of 3.6 and 3.6, respectively.

The light absorption of this optical recording medium in the amorphous state and the crystalline state is calculated from the optical constant and thickness of each layer at 63% and 66%, respectively, for light with a 680 nm wavelength, indicating that the light absorption for the crystalline state is slightly larger than that for the amorphous state. The calculated optical reflectance for the crystalline state is 27%, which agrees well with measurements made for the disk to confirm the validity of calculations.

The C/N ratio and erase ratio of this optical recording medium is measured in the same as in Example 16. A C/N ratio of 50 dB or more is obtained at a peak power of 11–14 mW, and an erase ratio of 20 dB or more is achieved at a bottom power of 4–5.5 mW, with the maximum erase ratio obtained being 21 dB.

In addition, one-beam overwriting is repeated 10,000 times under the conditions of a peak power of 12 mW, bottom power of 4.5 mW, and frequency of 15.3 MHz, followed by the same measuring process. The changes in the erase ratio are within 2 dB, showing no significant deterioration.

EXAMPLE 23

An optical recording media similar to the one in Example 16 except that the thickness of the first dielectric layer, recording layer, light absorbing layer, and reflecting layer is 210 nm, 20 nm, 30 nm, and 70 nm, respectively, and that a $Te_{38}W_{62}$ alloy is used as the material for the light absorption layer is produced.

The optical constants of the $Te_{38}W_{62}$ alloy used as the light absorbing layer include the refractive index and the extinction coefficient for a wave length of 680 nm of 5.2 and 3.2, respectively.

The light absorption of this optical recording medium in the amorphous state and the crystalline state is calculated from the optical constant and thickness of each layer at 45% and 55%, respectively, for light with a 680 nm wavelength, indicating that the light absorption for the crystalline state is larger than that for the amorphous state. The calculated optical reflectance for the crystalline state is 27%, which agrees well with measurements made for the disk to confirm the validity of calculations.

The C/N ratio and erase ratio of this optical recording medium is measured in the same as in Example 16. A C/N ratio of 50 dB or more is obtained at a peak power of 12–15 mW, and an erase ratio of 20 dB or more is achieved at a bottom power of 4.5–6 mW, with the maximum erase ratio obtained being 22 dB.

In addition, one-beam overwriting is repeated 10,000 times under the conditions of a peak power of 13 mW, bottom power of 5 mW, and frequency of 15.3 MHz, followed by the same measuring process. The changes in the erase ratio are within 2 dB, showing no significant deterioration.

EXAMPLE 24

An optical recording media similar to the one in Example 16 except that the thickness of the first dielectric layer, recording layer, second dielectric layer, and reflecting layer is 230 nm, 30 nm, 5 nm, and 30 nm, respectively, and that a $Nb_{33}W_{67}$ alloy is used as the material for the light absorption layer is produced.

The optical constants of the $Nb_{33}W_{67}$ alloy used as the light absorbing layer include the refractive index and the extinction coefficient for a wave length of 680 nm of 3.7 and 4.1, respectively.

The light absorption of this optical recording medium in the amorphous state and the crystalline state is calculated from the optical constant and thickness of each layer at 62% and 66%, respectively, for light with a 680 nm wavelength, indicating that the light absorption for the crystalline state is larger than that for the amorphous state. The calculated optical reflectance for the crystalline state is 26%, which agrees well with measurements made for the disk to confirm the validity of calculations.

The C/N ratio and erase ratio of this optical recording medium is measured in the same as in Example 16. A C/N ratio of 50 dB or more is obtained at a peak power of 13–15 mW, and an erase ratio of 20 dB or more is achieved at a bottom power of 4.5–6 mW, with the maximum erase ratio obtained being 22 dB.

In addition, one-beam overwriting is repeated 10,000 times under the conditions of a peak power of 14 mW, bottom power of 5 mW, and frequency of 15.3 MHz, followed by the same measuring process. The changes in the erase ratio are within 2 dB, showing no significant deterioration.

EXAMPLE 25

A recording layer, dielectric layer, and light absorbing layer are formed by high-frequency sputtering over a polycarbonate substrate 0.6 mm in thickness, 8.6 cm in diameter provided with a spiral groove of a 1.0 μm pitch. The substrate is rotated at 30 rpm during the sputtering process.

To do this, a vacuum container is evacuated to $1 \times 10^{-5}$ Pa, followed by the sputtering of ZnS containing 20 mol.% SiO2 in an Ar gas atmosphere of $2 \times 10^{-1}$ Pa to form a 250 nm thick first dielectric layer with a refractive index of about 2.2 on the substrate. Subsequently, an alloy target consisting of Pd, Nb, Ge, Sb, and Te is sputtered to form a 21 nm thick recording layer with a composition of $Pd_{0.2}Nb_{0.3}Ge_{18.5}Sb_{27}Te_{54}$ (atomic %). A second dielectric layer of the same material as the first dielectric layer is then formed up to a thickness of 8 nm, followed by the production of a 70 nm thick light absorbing layer of a $W_{59}Cr_{41}$ (atomic %) alloy on the second dielectric layer.

After removing this optical recording medium out of the vacuum container, the light absorbing layer is spin-coated with ultraviolet-curing acrylic resin (Dainippon Ink & Chemicals, Inc., SD-101), and it is cured by applying ultraviolet light to form a 10 μm thick resin layer, followed by the adhesion of this medium to a disk with the same constitution with a hot-melt adhesive (Toa Synthetic Chemistry Industrials Co., Ltd., VW30), thus obtaining an optical recording medium of the present invention.

While rotating this optical recording medium at 2400 rpm, a semiconductor laser beam with a wave length of 820 nm converged into an ellipse with its long axis oriented in the radial direction is applied from the substrate side to crystallize the recording layer for initialization.

The optical constants of the $W_{59}Cr_{41}$ alloy used as the light absorbing layer include the refractive index and the extinction coefficient for a wave length of 680 nm of 4.0 and 4.3, respectively.

The light absorption of this optical recording medium in the amorphous state and the crystalline state is calculated from the optical constant and thickness of each layer at 50% and 60%, respectively, for light with a 680 nm wavelength, indicating that the light absorption for the crystalline state is larger than that for the amorphous state. The calculated optical reflectance for the crystalline state is 22%, which agrees well with measurements made for the disk to confirm the validity of calculations.

While rotating this optical recording medium at a rotation speed of 3600 rpm, data on the track at a radius of 39 mm are repeatedly overwritten 100 times with a semiconductor laser beam modulated to a peak power of 7–15 mW and bottom power of 3–8 mW at a frequency of 15.3 MHz (pulse width 20 nsec) by using an optical head that is 0.6 in the numerical aperture of the objective lens and 680 nm in the wave length of the semiconductor laser beams. Then, while applying a semiconductor beam with a read power of 1.2 mW, the C/N ratio is determined under the condition of 30 kHz band width.

Furthermore, while one-beam overwriting is performed by exposing this portion to a 5.73 MHz (pulse width 20 nsec) semiconductor laser beam modulated as described above to a peak power of 7–15 mW and a bottom power of 3–8 mW, and then the erase ratio for the record marks formed previously with a 5.73 MHz beam is measured.

A C/N ratio of 50 dB or more is obtained at a peak power of 10–15 mW, and an erase ratio of 20 dB or more is achieved at a bottom power of 4–5.5 mW, with the maximum erase ratio obtained being 22 dB.

In addition, one-beam overwriting is repeated 10,000 times under the conditions of a peak power of 11 mW, bottom power of 4.5 mW and frequency of 15.3 MHz, followed by the same measuring process. The changes in the erase ratio are within 2 dB, showing no significant deterioration.

EXAMPLE 26

An optical recording media similar to the one in Example 16 except that the thickness of the first dielectric layer is 230 nm and that a $Mo_{62}Cr_{38}$ alloy is used as the material for the light absorption layer is produced.

The optical constants of the $Mo_{62}Cr_{38}$ alloy used as the light absorbing layer include the refractive index and the extinction coefficient for a wave length of 680 nm of 3.8 and 4.3, respectively.

The light absorption of this optical recording medium in the amorphous state and the crystalline state is calculated from the optical constant and thickness of each layer at 52% and 63%, respectively, for light with a 680 nm wavelength, indicating that the light absorption for the crystalline state is larger than that for the amorphous state. The calculated optical reflectance for the crystalline state is 20%, which agrees well with measurements made for the disk to confirm the validity of calculations.

The C/N ratio and erase ratio of this optical recording medium is measured in the same as in Example 25. A C/N ratio of 50 dB or more is obtained at a peak power of 9–15 mW, and an erase ratio of 20 dB or more is achieved at a bottom power of 4–5.5 mW, with the maximum erase ratio obtained being 22 dB.

In addition, one-beam overwriting is repeated 10,000 times under the conditions of a peak power of 11 mw, bottom power of 4.5 mW and frequency of 15.3 MHz, followed by the same measuring process. The changes in the erase ratio are within 2 dB, showing no significant deterioration.

EXAMPLE 27

An optical recording media similar to the one in Example 25 except that the thickness of the recording layer and second dielectric layer is 20 nm and 10 nm, respectively, and that a $W_{59}Cr_{41}$ alloy is used as the material for the light absorption layer is produced.

The optical constants of the $W_{59}Cr_{41}$ alloy used as the light absorbing layer include the refractive index and the extinction coefficient for a wave length of 680 nm of 4.0 and 4.3, respectively.

The light absorption of this optical recording medium in the amorphous state and the crystalline state is calculated from the optical constant and thickness of each layer at 60% and 64%, respectively, for light with a 680 nm wavelength, indicating that the light absorption for the crystalline state is larger than that for the amorphous state. The calculated optical reflectance for the crystalline state is 23%, which agrees well with measurements made for the disk to confirm the validity of calculations.

The C/N ratio and erase ratio of this optical recording medium is measured in the same as in Example 25. A C/N ratio of 50 dB or more is obtained at a peak power of 8–14 mW, and an erase ratio of 20 dB or more is achieved at a bottom power of 3.5–5.5 mW, with the maximum erase ratio obtained being 20 dB.

In addition, one-beam overwriting is repeated 10,000 times under the conditions of a peak power of 10 mW, bottom power of 4 mW, and frequency of 15.3 MHz, followed by the same measuring process. The changes in the erase ratio are within 2 dB, showing no significant deterioration.

EXAMPLE 28

An optical recording media similar to the one in Example 25 except that the thickness of the first dielectric layer, recording layer, and second dielectric layer is 210 nm, 20 nm, and 15 nm, respectively, and that a $Mo_{69}Nb_{31}$ alloy is used as the material for the light absorption layer is produced.

The optical constants of the $Mo_{69}Nb_{31}$ alloy used as the light absorbing layer include the refractive index and the extinction coefficient for a wave length of 680 nm of 3.8 and 3.9, respectively.

The light absorption of the optical recording medium in the amorphous state and the crystalline state is calculated from the optical constant and thickness of each layer at 63% and 65%, respectively, for light with a 680 nm wavelength, indicating that the light absorption is nearly the same for the amorphous state and the crystalline state. The calculated optical reflectance for the crystalline state is 26%, which agrees well with measurements made for the disk to confirm the validity of calculations.

The C/N ratio and erase ratio of this optical recording medium is measured in the same as in Example 25. A C/N ratio of 50 dB or more is obtained at a peak power of 9–15 mW, and an erase ratio of 20 dB or more is achieved at a bottom power of 4–5 mW, with the maximum erase ratio obtained being 22 dB.

In addition, one-beam overwriting is repeated 10,000 times under the conditions of a peak power of 11 mw, bottom power of 4.5 mW and frequency of 15.3 MHz, followed by the same measuring process. The changes in the erase ratio are within 2 dB, showing no significant deterioration.

EXAMPLE 29

An optical recording media similar to the one in Example 25 except that the thickness of the first dielectric layer, recording layer, second dielectric layer, and light absorbing layer is 230 nm, 30 nm, 10 nm, and 40 nm, respectively, and that a $Mo_{76}Y_{24}$ alloy is used as the material for the light absorption layer is produced.

The optical constants of the $Mo_{76}Y_{24}$ alloy used as the light absorbing layer include the refractive index and the extinction coefficient for a wave length of 680 nm of 3.7 and 3.7, respectively.

The light absorption of the optical recording medium in the amorphous state and the crystalline state is calculated from the optical constant and thickness of each layer at 64% and 64%, respectively, for light with a 680 nm wavelength, indicating that the light absorption is the same for the amorphous state and the crystalline state. The calculated optical reflectance for the crystalline state is 27%, which agrees well with measurements made for the disk to confirm the validity of calculations.

The C/N ratio and erase ratio of this optical recording medium is measured in the same as in Example 25. A C/N ratio of 50 dB or more is obtained at a peak power of 7–13 mW, and an erase ratio of 20 dB or more is achieved at a bottom power of 3–4 mW, with the maximum erase ratio obtained being 20.5 dB.

In addition, one-beam overwriting is repeated 10,000 times under the conditions of a peak power of 9 mW, bottom power of 3.5 mW, and frequency of 15.3 MHz, followed by the same measuring process. The changes in the erase ratio are within 2 dB, showing no significant deterioration.

EXAMPLE 30

An optical recording media similar to the one in Example 25 except that the thickness of the first dielectric layer, recording layer, second dielectric layer, and light absorbing layer is 230 nm, 30 nm, 5 nm, and 40 nm, respectively, and that a $W_{62}Te_{38}$ alloy is used as the material for the light absorption layer is produced.

The optical constants of the $W_{62}Te_{38}$ alloy used as the light absorbing layer include the refractive index and the extinction coefficient for a wave length of 680 nm of 5.2 and 3.2, respectively.

The light absorption of the optical recording medium in the amorphous state and the crystalline state is calculated from the optical constant and thickness of each layer at 63% and 65%, respectively, for light with a 680 nm wavelength, indicating that the light absorption is nearly the same for the amorphous state and the crystalline state. The calculated optical reflectance for the crystalline state is 26%, which agrees well with measurements made for the disk to confirm the validity of calculations.

The C/N ratio and erase ratio of this optical recording medium is measured in the same as in Example 25. A C/N ratio of 50 dB or more is obtained at a peak power of 8–13 mW, and an erase ratio of 20 dB or more is achieved at a bottom power of 3.5–4.5 mW, with the maximum erase ratio obtained being 20.5 dB.

In addition, one-beam overwriting is repeated 10,000 times under the conditions of a peak power of 10 mW, bottom power of 4 mW; and frequency of 15.3 MHz, followed by the same measuring process. The changes in the erase ratio are within 2 dB, showing no significant deterioration.

EXAMPLE 31

A recording layer, dielectric layer, and light absorbing layer are formed by high-frequency sputtering over a polycarbonate substrate 0.6 mm in thickness, 8.6 cm in diameter provided with a spiral groove of a 1.0 μm pitch. The substrate is rotated at 30 rpm during the sputtering process.

To do this, a vacuum container is evacuated to $1\times10^{-5}$ Pa, followed by the sputtering of ZnS containing 20 mol.% SiO2 in an Ar gas atmosphere of $2\times10^{-1}$ Pa to form a 240 nm thick first dielectric layer with a refractive index of about 2.2 on the substrate. Subsequently, an alloy target consisting of Pd, Nb, Ge, Sb, and Te is sputtered to form a 20 nm thick recording layer with a composition of $Pd_{0.2}Nb_{0.3}Ge_{18.5}Sb_{27}Te_{54}$ (atomic %). A second dielectric layer of the same material as the first dielectric layer is then formed up to a thickness of 10 nm, followed by the production of a 60 nm thick light absorbing layer of a $Te_{76}$, $TaN_{24}$ (mol.%) mixture on the second dielectric layer.

After removing this optical recording medium out of the vacuum container, the light absorbing layer is spin-coated with ultraviolet-curing acrylic resin (Dainippon Ink & Chemicals, Inc., SD-101), and it is cured by applying ultraviolet light to form a 10 μm thick resin layer, followed by the adhesion of this medium to a disk with the same constitution with a hot-melt adhesive (Toa Synthetic Chemistry Industrials Co., Ltd., VW30), thus obtaining an optical recording medium of the present invention.

While rotating this optical recording medium at 2400 rpm, a semiconductor laser beam with a wave length of 820 nm converged into an ellipse with its long axis oriented in the radial direction is applied from the substrate side to crystallize the recording layer for initialization.

The optical constants of the $Te_{76}TaN_{24}$ mixture used as the light absorbing layer include the refractive index and the extinction coefficient for a wave length of 680 nm of 5.2 and 3.2, respectively.

The light absorption of this optical recording medium in the amorphous state and the crystalline state is calculated from the optical constant and thickness of each layer at 60% and 64%, respectively, for light with a 680 nm wavelength, indicating that the light absorption for the crystalline state is larger than that for the amorphous state. The calculated optical reflectance for the crystalline state is 26%, which agrees well with measurements made for the disk to confirm the validity of calculations.

While rotating this optical recording medium at a rotation speed of 3600 rpm, data on the track at a radius of 39 mm are repeatedly overwritten 100 times with a semiconductor laser beam modulated to a peak power of 7–15 mW and bottom power of 3–8 mW at a frequency of 15.3 MHz (pulse width 20 nsec) by using an optical head that is 0.6 in the numerical aperture of the objective lens and 680 nm in the wave length of the semiconductor laser beams. Then, while applying a semiconductor beam with a read power of 1.2 mW, the C/N ratio is determined under the condition of 30 kHz band width.

Furthermore; while one-beam overwriting is performed by exposing this portion to a 5.73 MHz (pulse width 20 nsec) semiconductor laser beam modulated as described above to a peak power of 7–15 mW and a bottom power of 3–8 mW, and then the erase ratio for the record marks formed previously with a 5.73 MHz beam is measured.

A C/N ratio of 50 dB or more is obtained at a peak power of 8–14 mW, and an erase ratio of 20 dB or more is achieved at a bottom power of 3.5–5.5 mW, with the maximum erase ratio obtained being 21 dB.

In addition, one-beam overwriting is repeated 10,000 times under the conditions of a peak power of 11 mw, bottom power of 4.5 mW and frequency of 15.3 MHz, followed by the same measuring process. The changes in the erase ratio are within 2 dB, showing no significant deterioration.

EXAMPLE 32

An optical recording media similar to the one in Example 31 except that the thickness of the first dielectric layer, recording layer, second dielectric layer, and light absorbing layer is 230 nm, 30 nm, 5 nm, and 40 nm, respectively, and that a $W_{49}TiC_{51}$ mixture is used as the material for the light absorption layer is produced.

The optical constants of the $W_{49}TiC_{51}$ mixture used as the light absorbing layer include the refractive index and the extinction coefficient for a wave length of 680 nm of 3.8 and 3.8, respectively.

The light absorption of the optical recording medium in the amorphous state and the crystalline state is calculated from the optical constant and thickness of each layer at 63% and 65%, respectively, for light with a 680 nm wavelength, indicating that the light absorption is nearly the same for the amorphous state and the crystalline state. The calculated optical reflectance for the crystalline state is 26%, which agrees well with measurements made for the disk to confirm the validity of calculations.

The C/N ratio and erase ratio of this optical recording medium is measured in the same as in Example 31. A C/N ratio of 50 dB or more is obtained at a peak power of 8–13 mW, and an erase ratio of 20 dB or more is achieved at a bottom power of 3.55–5 mW, with the maximum erase ratio obtained being 20.5 dB.

In addition, one-beam overwriting is repeated 10,000 times under the conditions of a peak power of 10 mW, bottom power of 4 mW, and frequency of 15.3 MHz, followed by the same measuring process. The changes in the erase ratio are within 2 dB, showing no significant deterioration.

EXAMPLE 33

An optical recording media similar to the one in Example 31 except that the thickness of the first dielectric layer, recording layer, and light absorbing layer is 230 nm, 40 nm, and 40 nm, respectively, and that a $W_{48}SiC_{52}$ mixture is used as the material for the light absorption layer is produced.

The optical constants of the $W_{48}SiC_{52}$ mixture used as the light absorbing layer include the refractive index and the extinction coefficient for a wave length of 680 nm of 5.2 and 2.6, respectively.

The light absorption of the optical recording medium in the amorphous state and the crystalline state is calculated from the optical constant and thickness of each layer at 63% and 63%, respectively, for light with a 680 nm wavelength, indicating that the light absorption is the same for the amorphous state and the crystalline state. The calculated optical reflectance for the crystalline state is 24%, which agrees well with measurements made for the disk to confirm the validity of calculations.

The C/N ratio and erase ratio of this optical recording medium is measured in the same as in Example 31. A C/N ratio of 50 dB or more is obtained at a peak power of 7–13 mW, and an erase ratio of 20 dB or more is achieved at a bottom power of 3–4 mW, with the maximum erase ratio obtained being 20.5 dB.

In addition, one-beam overwriting is repeated 10,000 times under the conditions of a peak power of 10 mW, bottom power of 3.5 mW, and frequency of 15.3 MHz, followed by the same measuring process. The changes in the erase ratio are within 2 dB, showing no significant deterioration.

EXAMPLE 31

A recording layer, dielectric layer, reflecting layer, and light absorbing layer are formed by high-frequency sputtering over a polycarbonate substrate 0.6 mm in thickness, 8.6 cm in diameter provided with a spiral groove of a 1.0 μm pitch. The substrate is rotated at 30 rpm during the sputtering process.

To do this, a vacuum container is evacuated to $1 \times 10^{-5}$ Pa, followed by the sputtering of ZnS containing 20 mol.% SiO2 in an Ar gas atmosphere of $2 \times 10-1$ Pa to form a 240 nm thick first dielectric layer with a refractive index of about 2.2 on the substrate. Subsequently, an alloy target consisting of Pd, Nb, Ge, Sb, and Te is sputtered to form a 20 nm thick recording layer with a composition of $Pd_{0.2}Nb_{0.3}Ge_{18.5}Sb_{27}Te_{54}$ (atomic %). A second dielectric layer of the same material as the first dielectric layer is then formed up to a thickness of 10 nm, followed by the production of a 40 nm thick light absorbing layer of a $Nb_{43}AlN_{57}$ (mol.%) mixture on the second dielectric layer. Further, a 50 nm thick reflecting layer of a $Hf_{0.02}Pd_{0.002}Al_{0.978}$ alloy is formed.

After removing this optical recording medium out of the vacuum container, the reflecting layer is spin-coated with ultraviolet-curing acrylic resin (Dainippon Ink & Chemicals, Inc., SD-101), and it is cured by applying ultraviolet light to form a 10 μm thick resin layer, followed by the adhesion of this medium to a disk with the same constitution with a hot-melt adhesive (Toa Synthetic Chemistry Industrials Co., Ltd., VW30), thus obtaining an optical recording medium of the present invention.

While rotating this optical recording medium at 2400 rpm, a semiconductor laser beam with a wave length of 820 nm converged into an ellipse with its long axis oriented in the radial direction is applied from the substrate side to crystallize the recording layer for initialization.

The optical constants of the $Nb_{43}AlN_{57}$ mixture used as the light absorbing layer include the refractive index and the extinction coefficient for a wave length of 680 nm of 4.0 and 3.5, respectively.

The light absorption of this optical recording medium in the amorphous state and the crystalline state is calculated from the optical constant and thickness of each layer at 58% and 63%, respectively, for light with a 680 nm wavelength, indicating that the light absorption for the crystalline state is larger than that for the amorphous state. The calculated optical reflectance for the crystalline state is 23%, which agrees well with measurements made for the disk to confirm the validity of calculations.

While rotating this optical recording medium at a rotation speed of 3600 rpm, data on the track at a radius of 39 mm are repeatedly overwritten 100 times with a semiconductor laser beam modulated to a peak power of 7–15 mW and bottom power of 3–8 mW at a frequency of 15.3 MHz (pulse width 20 nsec) by using an optical head that is 0.6 in the numerical aperture of the objective lens and 680 nm in the wave length of the semiconductor laser beams. Then, while applying a semiconductor beam with a read power of 1.2 mW, the C/N ratio is determined under the condition of 30 kHz band width.

Furthermore, while one-beam overwriting is performed by exposing this portion to a 5.73 MHz (pulse width 20 nsec) semiconductor laser beam modulated as described above to a peak power of 7–15 mW and a bottom power of 3–8 mW, and then the erase ratio for the record marks formed previously with a 5.73 MHz beam is measured.

A C/N ratio of 50 dB or more is obtained at a peak power of 9–15 mW, and an erase ratio of 20 dB or more is achieved at a bottom power of 4–5.5 mW, with the maximum erase ratio obtained being 22 dB.

In addition, one-beam overwriting is repeated 10,000 times under the conditions of a peak power of 12 mW, bottom power of 4.5 mW and frequency of 15.3 MHz, followed by the same measuring process. The changes in the erase ratio are within 2 dB, showing no significant deterioration.

EXAMPLE 35

An optical recording media similar to the one in Example 34 except that the thickness of the first dielectric layer, recording layer, second dielectric layer, light absorbing layer, and reflecting layer is 220 nm, 25 nm, 15 nm, 30 nm, and 70 nm, respectively, and that a $Nb_{80}MoC_{20}$ mixture is used as the material for the light absorption layer is produced.

The optical constants of the $Nb_{80}MoC_{20}$ mixture used as the light absorbing layer include the refractive index and the extinction coefficient for a wave length of 680 nm of 3.8 and 4.0, respectively.

The light absorption of the optical recording medium in the amorphous state and the crystalline state is calculated from the optical constant and thickness of each layer at 66% and 66%, respectively, for light with a 680 nm wavelength, indicating that the light absorption is the same for the amorphous state and the crystalline state. The calculated optical reflectance for the crystalline state is 27%, which agrees well with measurements made for the disk to confirm the validity of calculations.

The C/N ratio and erase ratio of this optical recording medium is measured in the same as in Example 34. A C/N ratio of 50 dB or more is obtained at a peak power of 7–13 mW, and an erase ratio of 20 dB or more is achieved at a bottom power of 3–4.5 mW, with the maximum erase ratio obtained being 22 dB.

In addition, one-beam overwriting is repeated 10,000 times under the conditions of a peak power of 9 mW, bottom power of 3.5 mW, and frequency of 15.3 MHz, followed by the same measuring process. The changes in the erase ratio are within 2 dB, showing no significant deterioration.

EXAMPLE 36

An optical recording media similar to the one in Example 34 except that the thickness of the first dielectric layer, recording layer, second dielectric layer, and reflecting layer is 230 nm, 30 nm, 5 nm, and 30 nm, respectively, and that a $Mo_{38}ZrN_{62}$ mixture is used as the material for the light absorption layer is produced.

The optical constants of the $Mo_{38}ZrN_{62}$ mixture used as the light absorbing layer include the refractive index and the extinction coefficient for a wave length of 680 nm of 3.7 and 3.6, respectively.

The light absorption of the optical recording medium in the amorphous state and the crystalline state is calculated from the optical constant and thickness of each layer at 60% and 62%, respectively, for light with a 680 nm wavelength, indicating that the light absorption is nearly the same for the amorphous state and the crystalline state. The calculated optical reflectance for the crystalline state is 22%, which agrees well with measurements made for the disk to confirm the validity of calculations.

The C/N ratio and erase ratio of this optical recording medium is measured in the same as in Example 34. A C/N ratio of 50 dB or more is obtained at a peak power of 9–15 mW, and an erase ratio of 20 dB or more is achieved at a bottom power of 4.5–6 mW, with the maximum erase ratio obtained being 20.5 dB.

In addition, one-beam overwriting is repeated 10,000 times under the conditions of a peak power of 11 mw, bottom power of 5 mW, and frequency of 15.3 MHz, followed by the same measuring process. The changes in the erase ratio are within 2 dB, showing no significant deterioration.

EXAMPLE 37

An optical recording media similar to the one in Example 34 except that the thickness of the first dielectric layer, recording layer, second dielectric layer, and reflecting layer is 230 nm, 35 nm, 5 nm, and 30 nm, respectively, and that a $W_{47}ZrC_{53}$ mixture is used as the material for the light absorption layer is produced.

The optical constants of the $W_{47}ZrC_{53}$ mixture used as the light absorbing layer include the refractive index and the extinction coefficient for a wave length of 680 nm of 3.7 and 3.4, respectively.

The light absorption of the optical recording medium in the amorphous state and the crystalline state is calculated from the optical constant and thickness of each layer at 63% and 64%, respectively, for light with a 680 nm wavelength, indicating that the light absorption is nearly the same for the amorphous state and the crystalline state. The calculated optical reflectance for the crystalline state is 23%, which agrees well with measurements made for the disk to confirm the validity of calculations.

The C/N ratio and erase ratio of this optical recording medium is measured in the same as in Example 34. A C/N ratio of 50 dB or more is obtained at a peak power of 8–15 mW, and an erase ratio of 20 dB or more is achieved at a bottom power of 4–5.5 mW, with the maximum erase ratio obtained being 21 dB.

In addition, one-beam overwriting is repeated 10,000 times under the conditions of a peak power of 11 mw, bottom power of 4.5 mW and frequency of 15.3 MHz, followed by the same measuring process. The changes in the erase ratio are within 2 dB, showing no significant deterioration.

EXAMPLE 38

A recording layer, dielectric layer, light absorbing layer, and reflecting layer are formed by high-frequency sputtering over a polycarbonate substrate 0.6 mm in thickness, 8.6 cm in diameter provided with a spiral groove of a 1.0 $\mu$m pitch. The substrate is rotated at 30 rpm during the sputtering process.

To do this, a vacuum container is evacuated to $1\times10^{-5}$ Pa, followed by the sputtering of ZnS containing 20 mol.% SiO2 in an Ar gas atmosphere of $2\times10^{-1}$ Pa to form a 210 nm thick first dielectric layer on the substrate. Subsequently, a ternary alloy with a composition of about $Ge_{0.18}Sb_{0.26}Te_{0.56}$ is sputtered with a composite target having small pieces of Nb and Pb on it to form a 30 nm thick recording layer with a composition of $Pd_{0.002}Nb_{0.003}Ge_{0.175}Sb_{0.26}Te_{0.56}$. A second dielectric layer of the same material as the first dielectric layer is then formed up to a thickness of 5 nm, followed by its sputtering with a Ti target to produce a 40 nm thick light absorbing layer. Further, a 50 nm thick reflecting layer of a $Hf_{0.02}Pd_{0.002}Al_{0.978}$ alloy is formed.

After removing the disk out of the vacuum container, the reflecting layer is spin-coated with ultraviolet-curing acrylic resin (Dainippon Ink & Chemicals, Inc., SD-101), and it is cured by applying ultraviolet light to form a 10 $\mu$m thick resin layer, thus obtaining an optical recording medium of the present invention. It is then adhered to a similar disk produced in the same way with a hot-melt adhesive (Toa Synthetic Chemistry Industrials Co., Ltd., VW30) to form a double-sided disk.

A semiconductor laser beam with a wave length of 820 nm is applied to this optical recording medium, and the whole area of the recording layer of the disk is crystallized for initialization.

The light absorption of the disk in the amorphous state and the crystalline state is calculated from the optical constant and thickness of each layer at 63% and 66%, respectively, for light with a 680 nm wavelength, indicating that the light absorption for the amorphous state is larger than that for the crystalline state but the difference is not significantly large. The calculated optical reflectance for the crystalline state is 25%, which agrees well with measurements made for the disk to confirm the validity of calculations. While rotating the disk at a rotation speed of 3600 rpm, data on the track at a radius of 39 mm are repeatedly overwritten 100 times with a semiconductor laser beam modulated to a peak power of 8–15 mW and bottom power of 3–8 mW at a frequency of 5.73 MHz (pulse width 20 ns) or 15.3 MHz by using an optical head that is 0.6 in the numerical aperture (NA) of the objective lens and 680 nm in the wave length ($\lambda$) of the semiconductor laser beams (thus, $\lambda/NA=1.1$ $\mu$m). Then, while applying a semiconductor beam with a read power of 1.2 mW, the C/N ratio is determined under the condition of 30 kHz band width.

Further, the portion used above for the C/N ratio measurement at a frequency of 5.73 MHz is exposed to a semiconductor laser beam modulated to 15.3 MHz (pulse width 20 ns) in the same way as above to perform one-beam overwriting, followed by the measurement of the erase ratio from the signals from the previous record marks made at 5.73 MHz.

Measurements made above show that the C/N ratio for recording at 15.3 MHz (distance between marks is 0.96 $\mu$m, which is less than 1.1) is larger than that at 5.73 MHz (distance between marks is 2.6 $\mu$m, which is less than 1.1 $\mu$m) if the recording power is less than 13 mW whereas the C/N ratio for recording at 5.73 MHz is larger than that at 15.3 MHz if the recording power is 13 mW or more. Analysis is carried out to compare the amplitudes of signals read at the record power at which the maximum C/N ratio is obtained within the peak power range used for measurement. Results show that the amplitude of read signals from data recorded at 5.73 MHz is about 2.5 times as large as the amplitude of read signals from data recorded at 15.3 MHz. Moreover, an erase ratio of 20 dB or more is obtained at a bottom power of 4.5–6.5 mW. The amplitude of the read signals from the remainder of the record marks that have been erased after being recorded at 5.73 MHz is about 9 times as large as the amplitude of the read signals from the record marks recorded at 15.3 MHz.

In addition, one-beam overwriting is repeated 10,000 times under the conditions of a peak power of 12 mW, bottom power of 6 mW, and frequency of 15.3 MHz, followed by the same measuring process. The changes in the erase ratio are within 2 dB, showing no significant deterioration.

EXAMPLE 39

Using the same substrate as in Example 38, a dielectric layer and reflecting layer with the same compositions as in Example 38 are formed in the same way. The recording layer has a composition of $Nb_{0.005}Ge_{0.175}Sb_{0.26}Te_{0.56}$. The light absorbing layer is formed by sputtering a $WSi_2$ target. The thickness of the first dielectric layer, recording layer, second dielectric layer, light absorbing layer, and reflecting layer is 225 nm, 31 nm, 8 nm, 40 nm, and 30 nm, respectively.

The light absorption of this disk in the amorphous state and the crystalline state is calculated from the optical constant and thickness of each layer at 64% and 66%, respectively, for light with a 680 nm wavelength, indicating that the light absorption is nearly the same for the amorphous state and the crystalline state. The calculated optical reflectance for the crystalline state is 26%, which agrees well with measurements made for the disk to confirm the validity of calculations.

Subsequently, the C/N ratio and erasing ratio are measured in the same as in Example 38, and results show that the magnitude is reversed between the C/N ratio for recording at 15.3 MHz and that for recording at 5.73 MHz when the peak power is 11 mW.

Analysis is carried out to compare the amplitudes of signals read at the record power at which the maximum C/N ratio is obtained within the peak power range used for measurement. Results show that the amplitude of read signals from data recorded at 5.73 MHz is about 3.2 times as large as the amplitude of read signals from data recorded at 15.3 MHz. Moreover, An erase ratio of 20 dB or more is obtained at a bottom power of 4.5–6.5 mW. The amplitude of the read signals from the remainder of the record marks that have been erased after being recorded at 5.73 MHz is about 7.1 times as large as the amplitude of the read signals from the record marks overwritten at 15.3 MHz.

In addition, one-beam overwriting is repeated 10,000 times under the conditions of a peak power of 13.0 mW, bottom power of 6 mW, and frequency of 15.3 MHz, followed by the same measuring process. The changes in the erase ratio are within 2 dB, showing no significant deterioration.

EXAMPLE 40

A recording layer, dielectric layer, and reflecting layer are formed by high-frequency sputtering over a polycarbonate substrate 0.6 mm in thickness, 8.6 cm in diameter provided with a spiral groove of a 1.0 $\mu$m pitch. The substrate is rotated at 30 rpm during the sputtering process.

To do this, a vacuum container is evacuated to $1 \times 10^{-5}$ Pa, followed by the sputtering of ZnS containing 20 mol.% SiO2 in an Ar gas atmosphere of $2 \times 10^{-1}$ Pa to form a 230 nm thick first dielectric layer on the substrate. Subsequently, a ternary alloy with a composition of about $Ge_{0.18}Sb_{0.26}Te_{0.56}$ is sputtered with a composite target having small pieces of Nb and Pb on it to form a 35 nm thick recording layer with a composition of $Pd_{0.002}Nb_{0.003}Ge_{0.175}Sb_{0.26}Te_{0.56}$. A second dielectric layer of the same material as the first dielectric layer is then formed up to a thickness of 5 nm. Further, a 50 nm thick reflecting layer of a $Hf_{0.02}Pd_{0.002}Al_{0.978}$ alloy is formed.

After removing the disk out of the vacuum container, the reflecting layer is spin-coated with ultraviolet-curing acrylic resin (Dainippon Ink & Chemicals, Inc., SD-101), and it is cured by applying ultraviolet light to form a 10 $\mu$m thick resin layer, thus obtaining an optical recording medium of the present invention. It is then adhered to a similar disk produced in the same way with a hot-melt adhesive (Toa Synthetic Chemistry Industrials Co., Ltd., VW30 ) to form a double-sided disk.

A semiconductor laser beam with a wave length of 820 nm is applied to this optical recording medium, and the whole area of the recording layer of the disk is crystallized for initialization.

The light absorption of the disk in the amorphous state and the crystalline state is calculated from the optical constant and thickness of each layer at 78% and 71%, respectively, for light with a 680 nm wavelength, indicating that the light absorption for the amorphous state is larger than that for the crystalline state but the difference is not significantly large. The calculated optical reflectance for the crystalline state is 25%, which agrees well with measurements made for the disk to confirm the validity of calculations.

While rotating the disk at a rotation speed of 3600 rpm, data on the track at a radius of 39 mm are repeatedly overwritten 100 times with a semiconductor laser beam modulated to a peak power of 8–15 mW and bottom power of 3–8 mW at a frequency of 5.73 MHz (pulse width 20 ns) or 15.3 MHz by using an optical head that is 0.6 in the numerical aperture (NA) of the objective lens and 680 nm in the wave length ($\lambda$) of the semiconductor laser beams (thus, $\lambda/NA=1.1$ $\mu$m). Then, while applying a semiconductor beam with a read power of 1.2 mW, the C/N ratio is determined under the condition of 30 kHz band width.

Further, the portion used above for the C/N ratio measurement at a frequency of 5.73 MHz is exposed to a semiconductor laser beam modulated to 15.3 MHz (pulse width 20 ns) in the same way as above to perform one-beam overwriting, followed by the measurement of the erase ratio from the signals from the previous record marks made at 5.73 MHz.

Measurements made above show that the C/N ratio for recording at 15.3 MHz (distance between marks is 0.96 $\mu$m, which is less than 1.1) is larger than that at 5.73 MHz (distance between marks is 2.6 $\mu$m, which is less than 1.1 $\mu$m) if the recording power is less than 12 mW whereas the C/N ratio for recording at 5.73 MHz is larger than that at 15.3 MHz if the recording power is 12 mW or more. Analysis is carried out to compare the amplitudes of signals read at the record power at which the maximum C/N ratio is obtained within the peak power range used for measurement. Results show that the amplitude of read signals from data recorded at 5.73 MHz is about 2.5 times as large as the amplitude of read signals from data recorded at 15.3 MHz. Moreover, an erase ratio of 17 dB or more is obtained at a bottom power of 4–6 mW. The amplitude of the read signals from the remainder of the record marks that have been erased after being recorded at 5.73 MHz is about 5.1 times as large as the amplitude of the read signals from the record marks recorded at 15.3 MHz.

In addition, one-beam overwriting is repeated 10,000 times under the conditions of a peak power of 12 mW, bottom power of 6 mW, and frequency of 15.3 MHz, followed by the same measuring process. The changes in the erase ratio are within 2 dB, showing no significant deterioration.

Industrial Feasibility

The present invention can provide optical recording media that have good erasing characteristics and jitter characteristics and are highly resistant to repeated overwriting, and in particular can provide optical data recording media onto or from which data can be recorded, erased, and read by applying light. Thus, the invention can provide phase-change type rewritable optical recording media suitable for high-density recording.

What is claimed is:

1. A recorded optical recording medium, wherein said recording medium is recorded by a method comprising mark-edge recording and a recording layer is formed on a substrate to which a light beam is applied to record, erase, and read data with said recording and erasing of data being carried out by means of phase changes between an amorphous phase and a crystalline phase, and wherein the recording medium comprises a laminate member comprising: a transparent substrate, and a lower dielectric layer, a recording layer, an upper dielectric layer, a light absorbing layer, and a reflecting layer, formed on said substrate, with the upper dielectric layer having a thickness of 1–50 nm.

2. An optical recording medium as specified in claim 1 wherein the thickness of the recording layer is 10 to 45 nm.

3. An optical recording medium as specified in claim 2 wherein the material for the light absorbing layer consists essentially of Ti or an alloy of Ti.

4. An optical recording medium as specified in claim 2 wherein the material for the light absorbing layer consists essentially of Nb or an alloy of Nb.

5. An optical recording medium as specified in claim 2 wherein the material for the light absorbing layer consists essentially of W or an alloy of W.

6. An optical recording medium as specified in claim 2 wherein the material for the light absorbing layer consists essentially of Mo or an alloy of Mo.

7. An optical recording medium as specified in claim 1 wherein the thickness of the light absorbing layer is 1 to 100 nm.

8. An optical recording medium as specified in claim 1 wherein the material for the light absorbing layer consists essentially of at least one metal selected from the group of Ti, Zr, Hf, Cr, Ta, Mo, Mn, W, Nb, Rh, Ni, Fe, Pt, Os, Co, Zn, and Pd, or an alloy thereof.

9. An optical recording medium as specified in claim 1 wherein the material for the light absorbing layer has an optical constant whose refractive index is 1.0 to 8.0 or less and whose extinction coefficient is 1.5 to 6.5.

10. An optical recording medium as specified in claim 1 wherein the material for the light absorbing layer in its bulk state has a heat conductivity of 10 to 200 W/m·K.

11. An optical recording medium as specified in claim 1 wherein the material for the light absorbing layer consists of a metallic material made up of two or more metals with W or Mo being contained as essential component.

12. An optical recording medium as specified in claim 1 wherein the material for the light absorbing layer contains either W or Mo, plus at least one metal selected from the group of Re, Os, Nb, Ti, Te, Cr, Zr, Y, Hf, Ta, V, Sc, Mn, Ru, Fe, Co, Rh, Ir, Ni, Pd, Pt, and Au.

13. An optical recording medium as specified in claim 1 wherein the material for the light absorbing layer contains at least one selected from the group of high melting-point carbides, oxides, borides, and nitrides, with at least one selected from the group Ti, Nb, Mo, W, and Te being contained as essential component.

14. An optical recording medium as specified in claim 1 wherein the material for the light absorbing layer consists of a mixture or alloy of W and Si or a mixture or alloy of Mo and Si.

15. A recorded optical recording medium, wherein said recording medium is recorded by a method comprising mark-edge recording and a recording layer is formed on a substrate to which a light beam is applied to record, erase, and read data with said recording and erasing of data being carried out by means of phase changes between an amorphous phase and a crystalline phase, and wherein the recording medium comprises a laminate member comprising: a transparent substrate, and a lower dielectric layer, a recording layer, an upper dielectric layer, a light absorbing layer, and a reflecting layer, formed on said substrate, with the upper dielectric layer having a thickness of 1–30 nm.

16. An optical recording medium as specified in claim 15 wherein the thickness of the recording layer is 10 to 45 nm.

17. An optical recording medium as specified in claim 16 wherein the material for the light absorbing layer consists essentially of Ti or an alloy of Ti.

18. An optical recording medium as specified in claim 16 wherein the material for the light absorbing layer consists essentially of Nb or an alloy of Nb.

19. An optical recording medium as specified in claim 16 wherein the material for the light absorbing layer consists essentially of W or an alloy of W.

20. An optical recording medium as specified in claim 16 wherein the material for the light absorbing layer consists essentially of Mo or an alloy of Mo.

21. An optical recording medium as specified in claim 15 wherein the thickness of the light absorbing layer is 25 to 200 nm.

22. An optical recording medium as specified in claim 15 wherein the material for the light absorbing layer consists essentially of at least one metal selected from the group of Ti, Zr, Hf, Cr, Ta, Mo, Mn, W, Nb, Rh, Ni, Fe, Pt, Os, Co, Zn, and Pd, or an alloy thereof.

23. An optical recording medium as specified in claim 15 wherein the material for the light absorbing layer has an optical constant whose refractive index is 1.0 to 8.0 or less and whose extinction coefficient is 1.5 to 6.5.

24. An optical recording medium as specified in claim 15 wherein the material for the light absorbing layer in its bulk state has a heat conductivity of 10 W/m·K or more and 200 W/m·K or less.

25. An optical recording medium as specified in claim 15 wherein the material for the light absorbing layer consists of a metallic material made up of two or more metals with W or Mo being contained as essential component.

26. An optical recording medium as specified in claim 15 wherein the material for the light absorbing layer contains either W or Mo, plus at least one metal selected from the group of Re, Os, Nb, Ti, Te, Cr, Zr, Y, Hf, Ta, V, Sc, Mn, Ru, Fe, Co, Rh, Ir, Ni, Pd, Pt, and Au.

27. An optical recording medium as specified in claim 15 wherein the material for the light absorbing layer contains at least one selected from the group of high melting-point carbides, oxides, borides, and nitrides, with at least one selected from the group Ti, Nb, Mo, W, and Te being contained as essential component.

28. An optical recording medium as specified in claim 15 wherein the material for the light absorbing layer consists of mixture or alloy of W and Si or a mixture or alloy of Mo and Si.

29. A recorded optical recording medium, wherein said recording medium is recorded by a method comprising mark-edge recording, comprising a light absorbing layer, a dielectric layer of a thickness of 1–50 nm and recorded marks on a recording layer formed on a substrate to which a light beam is applied to record, erase, and read data with said recording and erasing of data being carried out by means of phase changes between an amorphous phase and a crystalline phase; wherein the amplitude of a read signal from a first recorded mark that is more than $\lambda$/NA apart from both a recorded mark preceding said first recorded mark and a recorded mark following said first recorded mark in the recording direction along the track is equal to or less than five times the amplitude of a read signal from a second recorded mark that is not more than $\lambda$/NA apart from both a recorded mark preceding said second recorded mark and a recorded mark following said second recorded mark in the recording direction along the track, wherein said λ and said NA denote the wavelength of the light used and the numerical aperture of the objective lens of the optical head, respectively.

30. An optical recording medium as specified in claim 29, wherein a recording layer is formed on a substrate to which a light beam is applied to record, erase, and read data with said recording and erasing of data being carried out by means of phase changes between amorphous and crystalline, and which recording medium comprises a laminate member consisting at least of a transparent substrate, first dielectric layer, recording layer, second dielectric layer, light absorbing layer, and reflecting layer, with the second dielectric layer having a thickness of 1 nm or more and 50 nm or less.

31. An optical recording medium as specified in claim 30 wherein the thickness of the recording layer is 10 to 45 nm.

32. An optical recording medium as specified in claim 30 wherein the thickness of the light absorbing layer is 1 to 100 nm.

33. An optical recording medium as specified in claim 29, wherein a recording layer is formed on a substrate to which a light beam is applied to record, erase, and read data with said recording and erasing of data being carried out by means of phase changes between amorphous and crystalline, and wherein the recording medium comprises a laminate member comprising of a transparent substrate, a first dielectric layer, a recording layer, a second dielectric layer, and a light absorbing layer, with the second dielectric layer having a thickness of at least 1 nm, but less than 30 nm.

34. An optical recording medium as specified in claim 33 wherein the thickness of the recording layer is 10 to 45 nm.

35. An optical recording medium as specified in either claim 31 or claim 34 wherein the material for the light absorbing layer consists essentially of Ti or an alloy of Ti.

36. An optical recording medium as specified in either claim 31 or claim 34 wherein the material for the light absorbing layer consists essentially of Nb or an alloy of Nb.

37. An optical recording medium as specified in either claim 31 or claim 34 wherein the material for the light absorbing layer consists essentially of W or an alloy of W.

38. An optical recording medium as specified in either claim 31 or claim 34 wherein the material for the light absorbing layer consists essentially of Mo or an alloy of Mo.

39. An optical recording medium as specified in claim 33 wherein the thickness of the light absorbing layer is 25 nm or more and 200 nm or less.

40. An optical recording medium as specified in either claim 30 or claim 33 wherein the material for the light absorbing layer consists essentially of at least one metal selected from the group of Ti, Zr, Hf, Cr, Ta, Mo, Mn, W, Nb, Rh, Ni, Fe, Pt, Os, Co, Zn, and Pd, or an alloy thereof.

41. An optical recording medium as specified in either claim 30 or claim 33 wherein the material for the light absorbing layer has an optical constant whose refractive index is 1.0 to 8.0 and whose extinction coefficient is 1.5 to 6.5.

42. An optical recording medium as specified in either claim 30 or claim 33 wherein the material for the light absorbing layer in its bulk state has a heat conductivity of 10 W/m·K or more and 200 W/m·K or less.

43. An optical recording medium as specified in either claim 30 or claim 33 wherein the material for the light absorbing layer consists of a metallic material made up of two or ,more metals with W or Mo being contained as essential component.

44. An optical recording medium as specified in either claim 36 or claim 33 wherein the material for the light absorbing layer contains either W or Mo, plus at least one metal selected from the group of Re, Os, Nb, Ti, Te, Cr, Zr, Y, Hf, Ta, V, Sc, Mn, Ru, Fe, Co, Rh, Ir, Ni, Pd, Pt, and Au.

45. An optical recording medium as specified in either claim 30 or claim 33 wherein the material for the light absorbing layer contains at least one selected from the group of high melting-point carbides, oxides, borides, and nitrides, with at least one selected from the group Ti, Nb, Mo, W, and Te being contained as essential component.

46. An optical recording medium as specified in either claim 30 or claim 33 wherein the material for the light absorbing layer consists of a mixture or alloy of W and Si or a mixture or alloy of Mo and Si.

47. A recorded optical recording medium, wherein said recording medium is recorded by a method comprising mark-edge recording, comprising a light absorbing layer, a dielectric layer of a thickness of 1–50 nm and recorded marks on a recording layer formed on a substrate to which a light beam is applied to record, erase, and read data with said recording and erasing of data being carried out by means of phase changes between an amorphous phase and a crystalline phase; wherein the carrier to noise ratio of a read signal from a first recorded mark that is more than λ/NA apart from both a recorded mark preceding said first recorded mark and a recorded mark following said first recorded mark in the recording direction along the track is equal to or less than five times the carrier to noise ratio of a read signal from a second recorded mark that is not more than λ/NA apart from both a recorded mark preceding said second recorded mark and a recorded mark following said second recorded mark in the recording direction along the track, wherein said λ and said NA denote the wavelength of the light used and the numerical aperture of the objective lens of the optical head, respectively.

48. An optical recording medium as specified in claim 47, wherein a recording layer is formed on a substrate to which a light beam is applied to record, erase, and read data with said recording and erasing of data being carried out by means of phase changes between amorphous and crystalline, and which recording medium comprises a laminate member consisting at least of a transparent substrate, first dielectric layer, recording layer, second dielectric layer, light absorbing layer, and reflecting layer, with the second dielectric layer having a thickness of 1 nm or more and 50 nm or less.

49. An optical recording medium as specified in claim 48 wherein the thickness of the recording layer is 10 to 45 nm.

50. An optical recording medium as specified in claim 48 wherein the thickness of the light absorbing layer is 1 to 100 nm.

51. An optical recording medium as specified in claim 47, wherein a recording layer is formed on a substrate to which a light beam is applied to record, erase, and read data with said recording and erasing of data being carried out by means of phase changes between amorphous and crystalline, and which recording medium comprises a laminate member consisting of a transparent substrate, first-dielectric layer, recording layer, second dielectric layer, and light absorbing layer, with /the second dielectric layer having a thickness of 1 nm or more and less than 30 nm.

52. An optical recording medium as specified in claim 51 wherein the thickness of the recording layer is 10 to 45 nm.

53. An optical recording medium as specified in either claim 49 or claim 52 wherein the material for the light absorbing layer consists essentially of Ti or an alloy of Ti.

54. An optical recording medium as specified in either claim 49 or claim 52 wherein the material for the light absorbing layer consists essentially of Nb or an alloy of Nb.

55. An optical recording medium as specified in either claim 49 or claim 52, wherein the material for the light absorbing layer consists essentially of W or an alloy of W.

56. An optical recording medium as specified in either claim 49 or claim 52 wherein the material for the light absorbing layer consists essentially of Mo or an alloy of Mo.

57. An optical recording medium as specified in claim 51 wherein the thickness of the light absorbing layer is 25 nm or more and 200 nm or less.

58. An optical recording medium as specified in either claim 51 wherein the material for the light absorbing layer consists essentially of at least one metal selected from the group Of Ti, Zr, Hf, Cr, Ta, Mo, Mn, W, Nb, Rh, Ni, Fe, Pt, Os, Co, Zn, and Pd, or an alloy thereof.

59. An optical recording medium as specified in either claim 48 or claim 51 wherein the material for the light absorbing layer has an optical constant whose refractive index is 1.0 to 8.0 and whose extinction coefficient is 1.5 to 6.5.

60. An optical recording medium as specified in either claim 48 or claim 51 wherein the material for the light absorbing layer in its bulk state has a heat conductivity of 10 W/m·K or more and 200 W/m·K or less.

61. An optical recording medium as specified in either claim 48 or claim 51 wherein the material for the light absorbing layer consists of a metallic material made up of two or more metals with W or Mo being contained as essential component.

62. An optical recording medium as specified in either claim 48 or claim 51 wherein the material for the light absorbing layer contains either W or Mo, plus at least one metal selected from the group of Re, Os, Nb, Ti, Te, Cr, Zr, Y, Hf, Ta, V, Sc, Mn, Ru, Fe, Co, Rh, Ir, Ni, Pd, Pt, and Au.

63. An optical recording medium as specified in either claim 48 or claim 51 wherein the material for the light absorbing layer contains at least one selected from the group of high melting-point carbides, oxides, borides, and nitrides, with at least one selected from the group Ti, Nb, Mo, W, and Te being contained as essential component.

64. An optical recording medium as specified in either claim 48 or claim 51 wherein the material for the light absorbing layer consists of a mixture or alloy of W and Si or a mixture or alloy of Mo and Si.

65. A recorded optical recording medium, wherein said recording medium is recorded by a method comprising mark-edge recording, comprising a light absorbing layer, a dielectric layer of a thickness of 1–50 nm and recorded marks on a recording layer, wherein, when a first recorded mark that is more than λ/NA apart from both a recorded mark preceding the first recorded mark and a recorded mark following the first recorded mark in the recording direction along the track is overwritten by a second recorded mark that is not more than λ/NA apart from both a recorded mark preceding the second recorded mark and a recorded mark following the second recorded mark in the recording direction along the track, the amplitude of a read signal from the second recorded mark is equal to or larger than five times the amplitude of a read signal from a remainder of the first recorded mark that has been overwritten, wherein said λ and said NA denote the wavelength of the light used and the numerical aperture of the objective lens of the optical head, respectively.

66. An optical recording medium as specified in claim 65, wherein a recording layer is formed on a substrate to which a light beam is applied to record, erase, and read data with said recording and erasing of data being carried out by means of phase changes between amorphous and crystalline, and which recording medium comprises a laminate member consisting at least of a transparent substrate, first dielectric layer, recording layer, second dielectric layer, light absorbing layer, and reflecting layer, with the second dielectric layer having a thickness of 1 nm or more and 50 nm or less.

67. An optical recording medium as specified in claim 66 wherein the thickness of the recording layer is 10 to 45 nm.

68. An optical recording medium as specified in claim 66 wherein the thickness of the light absorbing layer is 1 to 100 nm.

69. An optical recording medium as specified in claim 65, wherein a recording layer is formed on a substrate to which a light beam is applied to record, erase, and read data with said recording and erasing of data being carried out by means of phase changes between amorphous and crystalline, and wherein the recording medium comprises a laminate member comprising of a transparent substrate, a first dielectric layer, a recording layer, a second dielectric layer, and a light absorbing layer, with the second dielectric layer having a thickness of at least 1 nm, but less than 30 nm.

70. An optical recording medium as specified in claim 69 wherein the thickness of the recording layer is 10 to 45 nm.

71. An optical recording medium as specified in either claim 67 or claim 70 wherein the material for the light absorbing layer consists essentially of Ti or an alloy of Ti.

72. An optical recording medium as specified in either claim 67 or claim 70 wherein the material for the light absorbing layer consists essentially of Nb or an alloy of Nb.

73. An optical recording medium as specified in either claim 67 or claim 70, wherein the material for the light absorbing layer consists essentially of W or an alloy of W.

74. An optical recording medium as specified in either claim 67 or claim 70 wherein the material for the light absorbing layer consists essentially of Mo or an alloy of Mo.

75. An optical recording medium as specified in claim 69 wherein the thickness of the light absorbing layer is 25 nm or more and 200 nm or less.

76. An optical recording medium as specified in either claim 66 or claim 69 wherein the material for the light absorbing layer consists essentially of at least one metal selected from the group of Ti, Zr, Hf, Cr, Ta, Mo, Mn, W, Nb, Rh, Ni, Fe, Pt, Os, Co, Zn, and Pd, or an alloy thereof.

77. An optical recording medium as specified in either claim 66 or claim 69 wherein the material for the light absorbing layer has an optical constant those refractive index is 1.0 to 8.0 and whose extinction coefficient is 1.5 to 6.5.

78. An optical recording medium as specified in either claim 66 or claim 69 wherein the material for the light absorbing layer in its bulk state has a heat conductivity of 10 W/m·K or more and 200 W/m·K or less.

79. An optical recording medium as specified in either claim 66 or claim 69 wherein the material for the light absorbing layer consists of a metallic material made up of two or more metals with W or Mo being contained as essential component.

80. An optical recording medium as specified in either claim 66 or claim 69 wherein the material for the light absorbing layer contains either W or Mo, plus at least one metal selected from the group of Re, Os, Nb, Ti, Te, Cr, Zr, Y, Hf, Ta, V, Sc, Mn, Ru, Fe, Co, Rh, Ir, Ni, Pd, Pt, and Au.

81. An optical recording medium as specified in either claim 66 or claim 69 wherein the material for the light absorbing layer contains at least one selected from the group of high melting-point carbides, oxides, borides, and nitrides, with at least one selected from the group Ti, Nb, Mo, W, and Te being contained as essential component.

82. An optical recording medium as specified in either claim 66 or claim 69 wherein the material for the light absorbing layer consists of a mixture or alloy of W and Si or a mixture or alloy of Mo and Si.

83. A recorded optical recording medium, wherein said recording medium is recorded by a method comprising mark-edge recording, comprising a light absorbing layer, a dielectric layer of a thickness of 1–50 nm and recorded marks on a recording layer formed on a substrate to which a light beam is applied to record, erase, and read data with said recording and erasing of data being carried out by means of phase changes between an amorphous phase and a crystalline phase; wherein the recorded area of a first recorded mark that is more than $\lambda$/NA apart from both a recorded mark preceding said first recorded mark and a recorded mark following said first recorded mark in the recording direction along the track is equal to or less than five times the recorded area of a second recorded mark that is not more than $\lambda$/NA apart from both a recorded mark preceding said second recorded mark and a recorded mark following said second recorded mark in the recording direction along the track, wherein said $\lambda$ and said NA denote the wavelength of the light used and the numerical aperture of the objective lens of the optical head, respectively.

84. An optical recording medium as specified in claim 83, wherein a recording layer is formed on a substrate to which a light beam is applied to record, erase, and read data with said recording and erasing of data being carried out by means of phase changes between amorphous and crystalline, and which recording medium comprises a laminate member consisting at least of a transparent substrate, first dielectric layer, recording layer, second dielectric layer, light absorbing layer, and reflecting layer, with the second dielectric layer having a thickness of 1 nm or more and 50 nm or less.

85. An optical recording medium as specified in claim 84 wherein the thickness of the recording layer is 10 to 45 nm.

86. An optical recording medium as specified in claim 84 wherein the thickness of the light absorbing layer is 1 to 100 nm.

87. An optical recording medium as specified in claim 83, wherein a recording layer is formed on a substrate to which a light beam is applied to record, erase, and read data with said recording and erasing of data being carried out by means of phase changes between amorphous and crystalline, and wherein the recording medium comprises a laminate member comprising of, in order, a transparent substrate, a first dielectric layer, a recording layer, a second dielectric layer, and a light absorbing layer, with the second dielectric layer having a thickness of at least 1 nm, but less than 30 nm.

88. An optical recording medium as specified in claim 87 wherein the thickness of the recording layer is 10 to 45 nm.

89. An optical recording medium as specified in either claim 85 or claim 88 wherein the material for the light absorbing layer consists essentially of Ti or an alloy of Ti.

90. An optical recording medium as specified in either claim 85 or claim 89 wherein the material for the light absorbing layer consists essentially of Nb or an alloy of Nb.

91. An optical recording medium as specified in either claim 85 or claim 88 wherein the material for the light absorbing layer consists essentially of W or an alloy of W.

92. An optical recording medium as specified in either claim 85 or claim 88 wherein the material for the light absorbing layer consists essentially of Mo or an alloy of Mo.

93. An optical recording medium as specified in claim 87 wherein the thickness of the light absorbing layer is 25 nm or more and 200 nm or less.

94. An optical recording medium as specified in either claim 84 or claim 87 wherein the material for the light absorbing layer consists essentially of at least one metal selected from the group of Ti, Zr, Hf, Cr, Ta, Mo, Mn, W, Nb, Rh, Ni, Fe, Pt, Os, Co, Zn, and Pd, or an alloy thereof.

95. An optical recording medium as specified in either claim 84 or claim 87 wherein the material for the light absorbing layer has an optical constant whose refractive index is 1.0 to 8.0 and whose extinction coefficient is 1.5 to 6.5.

96. An optical recording medium as specified in either claim 84 or claim 87 wherein the material for the light absorbing layer in its bulk state has a heat conductivity of 10 W/m·K to 200 W/m·K.

97. An optical recording medium as specified in either claim 84 or claim 87 wherein the material for the light absorbing layer consists of a metallic material made up of two or more metals with W or Mo being contained as essential component.

98. An optical recording medium as specified in either claim 84 or claim 87 wherein the material for the light absorbing layer contains either W or Mo, plus at least one metal selected from the group of Re, Os, Nb, Ti, Te, Cr, Zr, Y, Hf, Ta, V, Sc, Mn, Ru, Fe, Co, Rh, Ir, Ni, Pd, Pt, and Au.

99. An optical recording medium as specified in either claim 84 or claim 87 wherein the material for the light absorbing layer contains at least one selected from the group of high melting-point carbides, oxides, borides, and nitrides, with at least one selected from the group Ti, Nb, Mo, W, and Te being contained as essential component.

100. An optical recording medium as specified in either claim 84 or claim 87 wherein the material for the light absorbing layer consists of a mixture or alloy of W and Si or a mixture or alloy of Mo and Si.

101. A recorded optical recording medium, wherein said recording medium is recorded by a method comprising mark-edge recording, comprising a dielectric layer, a light absorbing layer, a reflecting layer and recorded marks on a recording layer formed on a substrate to which a light beam is applied to record, erase, and read data with said recording and erasing of data being carried out by means of phase changes between an amorphous phase and a crystalline phase, wherein the shortest distance between recorded marks in the recording direction along the track is less than $\lambda$/NA, with $\lambda$ and NA denoting the wavelength of the light used and the numerical aperture of the objective lens of the optical head, respectively, and wherein the thickness of the recording layer is 60 nm or less, but more than 30 nm, and the dielectric layer is disposed between the recording layer and the reflecting layer with a thickness of 1–50 nm.

* * * * *